(12) United States Patent
Noguchi et al.

(10) Patent No.: US 11,021,165 B2
(45) Date of Patent: Jun. 1, 2021

(54) DRIVING ASSISTANCE DEVICE, DRIVING ASSISTANCE SYSTEM, PROGRAM, AND CONTROL METHOD FOR DRIVING ASSISTANCE DEVICE

(71) Applicant: HONDA MOTOR CO., LTD., Tokyo (JP)

(72) Inventors: Kohei Noguchi, Wako (JP); Ryuichi Nagai, Wako (JP); Hideki Kato, Wako (JP); Yuki Tsuda, Wako (JP); Atsushi Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 16/343,924

(22) PCT Filed: Nov. 28, 2016

(86) PCT No.: PCT/JP2016/085232
§ 371 (c)(1),
(2) Date: Apr. 22, 2019

(87) PCT Pub. No.: WO2018/096688
PCT Pub. Date: May 31, 2018

(65) Prior Publication Data
US 2019/0276036 A1 Sep. 12, 2019

(51) Int. Cl.
*B60W 40/09* (2012.01)
*G05D 23/19* (2006.01)
(Continued)

(52) U.S. Cl.
CPC .......... *B60W 40/09* (2013.01); *B60W 30/18* (2013.01); *B60W 30/188* (2013.01);
(Continued)

(58) Field of Classification Search
CPC ..... B60W 40/09; B60W 50/00; B60R 16/037; B60R 21/015; B60R 16/023; G05D 23/19;
(Continued)

(56) References Cited

U.S. PATENT DOCUMENTS

2010/0179730 A1* 7/2010 Hiemenz ................ B60N 2/502
701/45
2010/0209889 A1* 8/2010 Huang ................. G09B 19/167
434/65
(Continued)

FOREIGN PATENT DOCUMENTS

JP   H10-11106    1/1998
JP   2006-069358  3/2006
(Continued)

OTHER PUBLICATIONS

International Search Report, dated Feb. 28, 2017 (Feb. 28, 2017), 2 pages.
(Continued)

*Primary Examiner* — Yuri Kan
(74) *Attorney, Agent, or Firm* — Rankin, Hill & Clark LLP

(57) ABSTRACT

A driving assistance device includes a driving state detection portion that detects a driving state of a vehicle by a driver; an environment detection portion that detects an environment in which the vehicle travels; an emotion detection portion that detects the driver's emotion or change in emotion; a characteristic estimation portion that estimates the drivers characteristic with respect to the vehicle on the basis of the driving state of the driver in the environment detected by the environment detection portion, and the driver's emotion or change in emotion during the driving; and a change portion that changes setting of various control
(Continued)

in the vehicle on the basis of the driver's characteristic estimated by the characteristic estimation portion.

11 Claims, 11 Drawing Sheets

(51) Int. Cl.
| | | |
|---|---|---|
| *B62D 6/00* | (2006.01) | |
| *B60R 16/023* | (2006.01) | |
| *F16H 61/02* | (2006.01) | |
| *H04W 4/40* | (2018.01) | |
| *B60W 30/18* | (2012.01) | |
| *B60W 40/02* | (2006.01) | |
| *B60W 50/08* | (2020.01) | |
| *B60W 30/188* | (2012.01) | |
| *B60W 40/08* | (2012.01) | |

(52) U.S. Cl.
CPC ............ *B60W 40/02* (2013.01); *B60W 40/08* (2013.01); *B60W 50/08* (2013.01); *H04W 4/40* (2018.02); *B60W 2400/00* (2013.01); *B60W 2540/22* (2013.01); *B60W 2555/20* (2020.02)

(58) Field of Classification Search
CPC .......... B62D 6/00; G09B 19/16; G01C 21/00; F16H 61/02
See application file for complete search history.

(56) References Cited

U.S. PATENT DOCUMENTS

| | | | | |
|---|---|---|---|---|
| 2010/0209890 A1* | 8/2010 | Huang | ............... | G09B 9/05 434/65 |
| 2010/0209891 A1* | 8/2010 | Lin | ............... | G09B 19/167 434/66 |
| 2010/0209892 A1* | 8/2010 | Lin | ............... | G09B 19/167 434/71 |
| 2010/0211270 A1* | 8/2010 | Chin | ............... | B62D 6/007 701/44 |
| 2012/0150430 A1* | 6/2012 | French | ............... | G01C 21/3453 701/425 |
| 2014/0309790 A1* | 10/2014 | Ricci | ............... | A61B 7/04 700/276 |
| 2014/0309806 A1* | 10/2014 | Ricci | ............... | G06Q 10/02 701/1 |
| 2014/0309868 A1* | 10/2014 | Ricci | ............... | G06F 16/25 701/36 |
| 2015/0029014 A1* | 1/2015 | Bande Martinez | .... | G08B 21/18 340/439 |
| 2018/0023692 A1* | 1/2018 | Gauthier | ............... | F16H 59/44 701/55 |
| 2018/0208209 A1* | 7/2018 | Al-Dahle | ............... | B60W 10/22 |

FOREIGN PATENT DOCUMENTS

| | | |
|---|---|---|
| JP | 2013-242838 A | 12/2013 |
| JP | 2014-016870 A | 1/2014 |
| JP | 2015-110417 | 6/2015 |
| JP | 2015-143936 | 8/2015 |

OTHER PUBLICATIONS

International Preliminary Report on Patentability dated May 31, 2019, 7 pages.
Indian Office Action with English Text dated Dec. 18, 2020, 6 pages.
Indonesian Office Action with English translation dated Dec. 15, 2020, 4 pages.

* cited by examiner

FIG.4

FACTOR TABLE

|  |  | CONTROL TARGET | | | |
|---|---|---|---|---|---|
|  |  | ENGINE OUTPUT | SUSPENSION | ABS | ... |
| SKILL PARAMETER | BRAKE | 0(%) | C(%) | B(%) | ... |
| | ACCELERATOR | A(%) | 0(%) | 0(%) | ... |
| | ENGINE BEHAVIOR | B(%) | 0(%) | 0(%) | ... |
| | SUSPENSION BEHAVIOR | 0(%) | D(%) | C(%) | ... |
| | TOTAL | E(%) | E(%) | E(%) | ... |
| EMOTION PARAMETER | | F(%) | 0(%) | F(%) | ... |

DRIVING ASSISTANCE DEVICE, DRIVING ASSISTANCE SYSTEM, PROGRAM, AND CONTROL METHOD FOR DRIVING ASSISTANCE DEVICE

TECHNICAL FIELD

The present invention relates to a driving assistance device, a driving assistance system, a program, and a control method for a driving assistance device.

BACKGROUND ART

Heretofore, a driving assistance device that supports driving of a driver has been known (see Patent Literatures 1 and 2, for example).

A device described in Patent Literature 1 calculates a driving state indicator indicating either a characteristic of a driver or a driving situation, and varies a characteristic of a power source on the basis of the calculated driving state indicator.

A device described in Patent Literature 2 sets an assistance amount of assisting a driver's driving, on the basis of an environmental difficulty level of the driver's driving required by the external environment of a vehicle, and the driver's driving skill.

CITATION LIST

Patent Literature

[Patent Literature 1]
Japanese Patent Laid-Open No. 10-11106
[Patent Literature 2]
Japanese Patent Laid-Open No. 2015-110417

SUMMARY OF INVENTION

Technical Problem

However, while the device of Patent Literature 1 varies the characteristic of the power source on the basis of the characteristic of the driver, environment and the like are not taken into consideration.

Additionally, while the device of Patent Literature 2 sets the assistance amount according to the environmental difficulty level, since a driver has environments that he/she is good at and is not good at, setting of each type of control of the vehicle varies by the driver.

The present invention has been made in view of the foregoing, and aims to increase accuracy of setting of various control of a vehicle.

Solution to Problem

To achieve the above objective, a driving assistance device (100, 300) of an aspect of the present invention is a driving assistance device (100, 300) that supports driving of a driver, characterized by including: a driving state detection portion (11, 21) that detects a driving state of a vehicle (10, 20) by the driver; an environment detection portion (14, 122, 126, 172, 24, 222, 226, 322) that detects an environment in which the vehicle (10, 20) travels; an emotion detection portion (124, 125, 174, 224, 225, 324) that detects the driver's emotion or change in emotion; a characteristic estimation portion (173, 174, 323, 324) that estimates the driver's characteristic with respect to the vehicle (10, 20) on the basis of the driving state of the driver in the environment detected by the environment detection portion (14, 122, 126, 172, 24, 222, 226, 322), and the driver's emotion or change in emotion during the driving; and a setting change portion (175, 325) that changes setting of various control in the vehicle (10, 20) on the basis of the driver's characteristic estimated by the characteristic estimation portion (173, 174, 323, 324).

According to this configuration, the driver's characteristic with respect to the vehicle is estimated on the basis of the driving state of the driver in the environment detected by the environment detection portion, and the driver's emotion or change in emotion during driving, and the setting of various control in the vehicle is changed on the basis of the estimated driver's characteristic. Accordingly, the setting of various control of the vehicle can be set with high accuracy on the basis of the driving state of the driver in the environment and the driver's emotion or change in emotion.

An aspect of the present invention is characterized in that in the driving assistance device (100, 300), the characteristic estimation portion (173, 174, 323, 324) determines the driver's driving skill on the basis of the driving state of the driver in the multiple environments detected by the environment detection portion (14, 122, 126, 172, 24, 222, 226, 322), and thereby estimates the driver's characteristic.

According to this configuration, the driver's driving skill can be determined accurately on the basis of the driving states in multiple environments, whereby the estimation accuracy of the driver's characteristic can be improved.

An aspect of the present invention is characterized in that in the driving assistance device (100, 300), the characteristic estimation portion (173, 174, 323, 324) determines whether the emotion or change in emotion detected by the emotion detection portion (124, 125, 174, 224, 225, 324) is an emotion or change in emotion that is appropriate for driving, and thereby estimates the driver's characteristic.

According to this configuration, the driver's characteristic can be estimated on the basis of the driver's emotion during driving.

An aspect of the present invention is characterized in that in the driving assistance device (100, 300), the characteristic estimation portion (173, 174, 323, 324) determines the driver's driving tendency on the basis of the driving state of the driver in the multiple environments detected by the environment detection portion (14, 122, 126, 172, 24, 222, 226, 322), and thereby estimates the driver's characteristic.

According to this configuration, the driver's driving skill can be determined accurately on the basis of the driving state in multiple environments, whereby the estimation accuracy of the driver's characteristic can be improved.

An aspect of the present invention is characterized in that in the driving assistance device (100, 300), the characteristic estimation portion (173, 174, 323, 324) estimates the driver's characteristic on the basis of a time when the preset emotion determined to be appropriate for the driving appears in the driving, or a time when the preset emotion determined to be inappropriate for the driving appears in the driving.

According to this configuration, the driver's characteristic can be estimated accurately on the basis of the driver's emotion that appears in driving.

An aspect of the present invention is characterized in that in the driving assistance device (100, 300), the characteristic estimation portion (173, 174, 323, 324) estimates the driver's characteristic on the basis of the frequency of emotion change from the preset emotion determined to be appropriate for the driving to the preset emotion determined to be inappropriate for the driving, or emotion change from the preset emotion determined to be inappropriate for the driving to the preset emotion determined to be appropriate for the driving.

According to this configuration, the driver's characteristic is estimated on the basis of the frequency, during driving, of changing to an emotion determined to be appropriate for driving, and to an emotion determined to be inappropriate for driving. Hence, when the driver's emotion changes frequently, it may be determined that the driver lacks concentration, and the driver's characteristic is not suited for driving.

An aspect of the present invention is characterized in that in the driving assistance device (100), the change portion (176) changes the setting of various control according to the driver's emotion or change in emotion detected by the emotion detection portion (124, 125, 174) when the driver starts the driving, or during the driving.

According to this configuration, the setting of various control is changed according to the driver's emotion or change in emotion at the start of driving or during driving. Hence, if the driver's emotion is an emotion inappropriate for driving, the setting of various control may be changed to allow safe travel of the vehicle.

A driving assistance system (50) of an aspect of the present invention includes: an information detection device (200) installed in a vehicle (20); and a server device (3), and is characterized in that the server device (3) includes a receiver (31) that receives, from the information detection device (200), operation state information indicating a driving state of the vehicle (20) by a driver, environment information indicating an environment in which the vehicle (20) travels, and emotion information indicating the driver's emotion or change in emotion, a characteristic estimation portion (323, 324) that estimates the driver's characteristic with respect to the vehicle (20) on the basis of the driving state of the driver in an environment indicated by the environment information and the driver's emotion or change in emotion during the driving, a setting change portion (325) that generates setting information on various control performed in the vehicle (20), on the basis of the driver's characteristic estimated by the characteristic estimation portion (323, 324), and a transmitter (31) that transmits the setting information generated by the setting change portion (325) to the information detection device (200).

According to this configuration, the driver's characteristic with respect to the vehicle is estimated on the basis of the driving state of the driver in the environment and the driver's emotion or change in emotion during driving, and the setting of various control in the vehicle is changed on the basis of the estimated driver's characteristic. Accordingly, the setting of various control of the vehicle can be set with high accuracy on the basis of the driving state of the driver in the environment and the driver's emotion or change in emotion.

An aspect of the present invention is characterized in that in the driving assistance system (50): the characteristic estimation portion (323, 324) includes a skill evaluation portion (323) that generates a skill evaluation parameter evaluating a driving skill of the driver in an environment indicated by the environment information, on the basis of the operation state information, and an emotion evaluation portion (324) that generates an emotion evaluation parameter evaluating an emotion of the driver with respect to an environment indicated by the environment information, on the basis of the emotion information; and the skill evaluation parameter and the emotion evaluation parameter are stored, in association with identification information for identifying the driver received from the information detection device (200), in a storage (33).

According to this configuration, the skill parameter evaluating the driver's driving skill and the emotion parameter evaluating the driver's emotion can be stored in the storage in association with the driver's identification information.

An aspect of the present invention is characterized in that in the driving assistance system (50), the server device (3) includes a first classification portion (326) that compares the skill evaluation parameter of each driver with a preset threshold, and classifies the each driver into a preset category according to a comparison result.

According to this configuration, each driver can be classified into a category set in accordance with the driver's skill.

An aspect of the present invention is characterized in that in the driving assistance system (50), the server device (3) includes a second classification portion (326) that compares the emotion evaluation parameter of each driver with a preset threshold, and classifies the each driver into a preset category according to a comparison result.

According to this configuration, each driver can be classified into a category set in accordance with the driver's emotion.

An aspect of the present invention is characterized in that in the driving assistance system (50), the server device (3) transmits, to the information detection device (200) installed in the vehicle (20) driven by each of drivers classified into the same category by the first classification portion (326), information prompting participation in an event held for the each category.

According to this configuration, it is possible to transmit information prompting participation in an event held for each category, to each of drivers classified into the same category.

An aspect of the present invention is characterized in that in the driving assistance system (50), the server device (3) transmits, to the information detection device (200) installed in the vehicle (20) driven by each of drivers classified into the same category by the second classification portion (326), information prompting participation in an event held for the each category.

According to this configuration, it is possible to transmit information prompting participation in an event to each of drivers classified into the same category.

An aspect of the present invention provides a program executed by a computer (17, 32) installed in a driving assistance device (100, 300) that supports driving of a driver, in which the program causes the computer (17, 32) to perform: a process (11, 21) of detecting a driving state of a vehicle (10, 20) by the driver; a process (14, 122, 126, 172, 24, 222, 226, 322) of detecting an environment in which the vehicle (10, 20) travels; a process (124, 125, 174, 224, 225, 324) of detecting the driver's emotion or change in emotion; a process (173, 174, 323, 324) of estimating the driver's characteristic with respect to the vehicle (10, 20), on the basis of the driving state of the driver in the detected environment and the driver's emotion or change in emotion during the driving; and a process (175, 325) of changing setting of various control in the vehicle (10, 20) on the basis of the estimated driver's characteristic.

According to this configuration, the driver's characteristic with respect to the vehicle is estimated on the basis of the driving state of the driver in the environment and the driver's emotion or change in emotion during driving, and the setting of various control in the vehicle is changed on the basis of the estimated driver's characteristic. Accordingly, the setting of various control of the vehicle can be set with high accuracy on the basis of the driving state of the driver in the environment and the driver's emotion or change in emotion.

An aspect of the present invention provides a control method of a driving assistance device (100, 300) that supports driving of a driver, the method including: a step (11, 21) of detecting a driving state of a vehicle (10, 20) by the driver; a step (14, 122, 126, 172, 24, 222, 226, 322) of detecting an environment in which the vehicle (10, 20) travels; a step (124, 125, 174, 224, 225, 324) of detecting the driver's emotion or change in emotion; a step (173, 174, 323, 324) of estimating the driver's characteristic with respect to the vehicle (10, 20), on the basis of the driving state of the driver in the detected environment and the driver's emotion or change in emotion during the driving; and a step (175, 325) of changing setting of various control in the vehicle (10, 20) on the basis of the estimated driver's characteristic.

According to this configuration, the driver's characteristic with respect to the vehicle is estimated on the basis of the driving state of the driver in the environment and the driver's emotion or change in emotion during driving, and the setting of various control in the vehicle is changed on the basis of the estimated driver's characteristic. Accordingly, the setting of various control of the vehicle can be set with high accuracy on the basis of the driving state of the driver in the environment and the driver's emotion or change in emotion.

Advantageous Effect of Invention

An aspect of the present invention can increase accuracy of setting of various control of a vehicle.

BRIEF DESCRIPTION OF DRAWINGS

FIG. 4 is a diagram showing an example of a factor table.

DESCRIPTION OF EMBODIMENTS

First Embodiment

A first embodiment of the present invention will be described with reference to the accompanying drawings.

Figure 1:
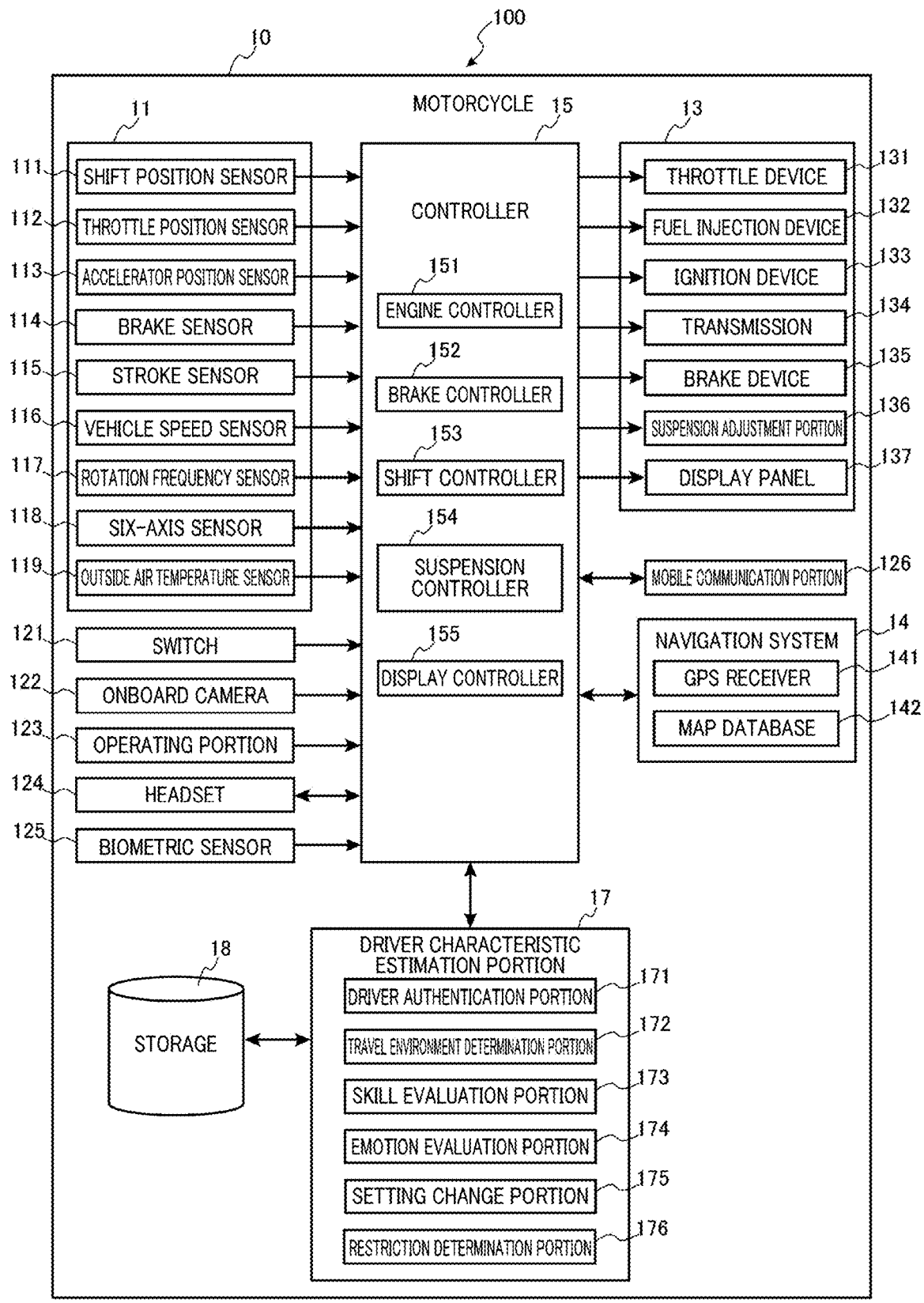
FIG. 1 is a functional block diagram showing a configuration of a control system of a motorcycle of a first embodiment.

FIG. 1 is a functional block diagram showing a configuration of a control system of a motorcycle 10 in which a driving assistance device 100 of the present invention is installed. While the embodiment is described by using, as an example, a case where the driving assistance device 100 is installed in the motorcycle 10, the vehicle into which the driving assistance device 100 can be installed is not limited to the motorcycle 10, and may be an automatic four-wheeled vehicle or an automatic three-wheeled vehicle. Instead, the motorcycle 10 may be a straddle-ridden bike, or may be a motor scooter.

The motorcycle 10 includes a sensor portion 11, a switch 121, an onboard camera 122, an operating portion 123, a headset 124, a biometric sensor 125, an actuator 13, a mobile communication portion 126, a navigation system 14, and a controller 15.

The sensor portion 11 is sensors installed in the motorcycle 10, and includes a shift position sensor 111, a throttle position sensor 112, an accelerator position sensor 113, a brake sensor 114, a stroke sensor 115, a vehicle speed sensor 116, a rotation frequency sensor 117, a six-axis sensor 118, and an outside air temperature sensor 119.

The shift position sensor 111 detects the gear speed of a transmission 134. The shift position sensor 111 outputs a signal indicating the detected gear speed to the controller 15.

The throttle position sensor 112 detects the position of a throttle valve (not shown). The throttle position sensor 112 outputs a signal indicating the detected position of the throttle valve to the controller 15.

The accelerator position sensor 113 detects an operation amount of an accelerator. The accelerator position sensor 113 outputs a signal indicating the detected operation amount to the controller 15.

The brake sensor 114 detects a brake pressure acting on a brake actuator (not shown), and an operation amount of a brake. The brake sensor 114 outputs a signal indicating the detected brake pressure and a signal indicating the detected brake operation amount to the controller 15.

The stroke sensor 115 is provided in each of a front suspension suspending a front wheel of the motorcycle 10, and a rear suspension suspending a rear wheel of the motorcycle 10. The stroke sensors 115 respectively detect an actuation amount of the front suspension and an actuation amount of the rear suspension, and output signals indicating the detected actuation amount to the controller 15.

The vehicle speed sensor 116 detects the vehicle speed of the motorcycle 10. The vehicle speed sensor 116 outputs a signal indicating the detected vehicle speed to the controller 15.

The rotation frequency sensor 117 detects the rotation frequency of a power unit such as an engine and a motor. The rotation frequency sensor 117 outputs a signal indicating the detected rotation frequency to the controller 15.

The six-axis sensor 118 includes an acceleration sensor that detects acceleration in three directions (X, Y, Z) including the longitudinal, transverse, and vertical directions of the motorcycle 10, and a three-axis gyro sensor that detects the angular velocity about each of the X, Y, and Z axes. The six-axis sensor 118 outputs a signal indicating the detected acceleration and angular velocity to the controller 15.

The outside air temperature sensor 119 measures the outside air temperature, and outputs a signal indicating the measured outside air temperature to the controller 15.

Hereinbelow, a signal indicating a detected value detected and output to the controller 15 by the sensor portion 11 is simply referred to as a detected value.

The switch 121 is various switches included in the motorcycle 10, and is, for example, a main switch that turns on and off power supply to electrical components mounted on the motorcycle 10, a turn signal switch that flashes a turn signal, a headlight switch that lights a headlight, a shift up switch that upshifts the transmission 134, a shift down switch that downshifts the transmission 134, a starter switch that starts the engine, and other switches. The switch 121 outputs, to the controller 15, a signal indicating that the switch 121 is turned on when the switch 121 is turned on, and outputs, to the controller 15, a signal indicating that the switch 121 is turned off when the switch 121 is turned off.

The onboard camera 122 includes image sensors such as a CCD (charge coupled device) and a CMOS (complementary metal oxide semiconductor). The onboard camera 122 includes a front camera that picks up an image of the front (road surface) of the motorcycle 10, and a rear camera that picks up an image of the driver (particularly the face of the driver). The rear camera may be provided on a helmet worn by the driver. The onboard camera 122 outputs the picked up image to the controller 15.

The operating portion 123 is provided with operating buttons, for example, and receives operations by the driver. The operating portion 123 is used when identification information for identifying the driver is received. The operating portion 123 outputs an operation signal corresponding to the received operation to the controller 15.

The headset 124 is provided on the helmet worn by the driver, for example, and has a microphone and other components. The microphone collects sound made by the driver, and outputs a sound signal to the controller 15.

The biometric sensor 125 is attached to the driver driving the motorcycle 10, and detects, as biometric information, the driver's heart rate, blood pressure, respiratory frequency, sweat amount, and body temperature, for example. The biometric sensor 125 outputs the detected biometric information to the controller 15.

The mobile communication portion 126 has a radio communication circuit and an antenna, and connects to a mobile communication network to perform mobile communication.

The navigation system 14 includes a GPS receiver 141 that receives a GPS signal transmitted from a GPS satellite, and a map database 142 that stores map information.

The navigation system 14 measures the location (latitude and longitude) of the motorcycle 10 on the basis of the GPS signal received by the GPS receiver 141. Additionally, the navigation system 14 presents a guidance route to a set destination on the basis of the measured location of the motorcycle 10 and map information acquired from the map database 142.

The actuator 13 includes a throttle device 131, a fuel injection device 132, an ignition device 133, the transmission 134, a brake device 135, a suspension adjustment portion 136, and a display panel 137.

The throttle device 131 controls the position of the throttle valve under control of the controller 15.

The fuel injection device 132 is attached to an intake port that supplies a mixture of air and fuel into a combustion chamber of the engine, and injects fuel under control of the controller 15. The fuel injection device 132 may be a port injection system or a direct injection system, and the number of injection nozzles, for example, is not particularly limited. When the fuel injection device 132 is a port injection system, the fuel injection device 132 injects fuel according to the position of the throttle valve.

The ignition device 133 includes a spark plug, and ignites the mixture filling the combustion chamber of the engine.

The transmission 134 has multiple gear speeds, and switches the gear speed according to an operation of the shift up switch or the shift down switch of the switch 121 to change the transmission gear ratio (reduction gear ratio) and transmit rotational force transmitted from the engine to a rear wheel of the motorcycle 10.

The brake device 135 is disposed in each of the front wheel and rear wheel of the motorcycle 10, and applies braking force to at least one of the front wheel and the rear wheel according to a driver's operation of a brake lever and a foot brake.

The suspension adjustment portion 136 adjusts a suspension device (not shown) interposed between a tire and a body frame of the motorcycle 10. For example, when the motorcycle 10 includes an active suspension device, the suspension adjustment portion 136 adjusts the vehicle height of the motorcycle 10, the damping force of a damper, and the like, under control of the controller 15.

The display panel 137 is configured of an LCD (liquid crystal display) display, for example, and displays the vehicle speed, engine speed, travel distance, lighting state of lamps, remaining fuel, and the like of the motorcycle 10. The display panel 137 of the embodiment also displays information displayed by a later-mentioned driver characteristic estimation portion 17 and information transmitted from a server device 3 described in a second embodiment.

The controller 15 is a processor that executes a program. For example, the controller 15 may be configured of a CPU, an MPU, a microcomputer, or another arithmetic processing unit. Instead, the controller 15 may be configured of an integrated circuit, a microcontroller, a microcomputer, a programmable logic controller, an application specific integrated circuit, or another programmable circuit. Moreover, the controller 15 may be configured of a system on chip (e.g., so-called SoC device) that integrates a ROM and a RAM.

The controller 15 includes, as functional blocks, an engine controller 151, a brake controller 152, a shift controller 153, a suspension controller 154, and a display controller 155.

The aforementioned functional blocks are configured by executing a program stored in an unillustrated ROM by the controller 15.

The engine controller 151 controls the throttle device 131, the fuel injection device 132, and the ignition device 133. Specifically, the engine controller 151 controls the throttle device 131 on the basis of the detected value of the sensor portion 11, for example, and adjusts the position of the throttle value. The engine controller 151 also controls the fuel injection device 132 on the basis of the detected value of the sensor portion 11, for example, and controls the injection timing and injection amount of fuel. The engine controller 151 also controls the ignition device 133 on the basis of the detected value of the sensor portion 11, for example, and ignites the spark plug at an appropriate timing.

The brake controller 152 controls the braking force of the brake device 135 on the basis of the detected value of the sensor portion 11, for example. The brake controller 152 also performs anti-lock braking control (hereinafter referred to as ABS control).

The shift controller 153 drives a motor (not shown) according to an operation of the shift up switch or the shift down switch of the switch 121 to shift up or shift down the transmission 134.

The suspension controller 154 controls the suspension adjustment portion 136 to adjust the vehicle height of the motorcycle 10, set the suspension, or the like.

The display controller 155 controls the display state of the display panel 137.

The controller 15 outputs, to the driver characteristic estimation portion 17, the detected value of the sensor portion 11, biometric information detected by the biometric sensor 125, image picked up by the onboard camera 122, sound information on the driver input through the microphone on the headset 124, and traffic information, map information, and location information acquired from the navigation system 14. The controller 15 also outputs, to the driver characteristic estimation portion 17, traffic information and weather information downloaded from a network such as the Internet by controlling the mobile communication portion 126. Hereinafter, the detected value of the sensor portion 11, biometric information, sound information, picked up images, traffic information, map information, location information, and weather information are collectively referred to as characteristic information. The controller 15 also outputs identification information received by the operating portion 123 to the driver characteristic estimation portion 17.

The motorcycle 10 also includes the driver characteristic estimation portion 17 and a storage 18.

The driver characteristic estimation portion 17 is a processor that executes a program. The driver characteristic estimation portion 17 too, may be configured of a CPU, an MPU, a microcomputer, or another arithmetic processing unit. Instead, the driver characteristic estimation portion 17 may be configured of an integrated circuit, a microcontroller, a microcomputer, a programmable logic controller, an application specific integrated circuit, or another programmable circuit. Moreover, the driver characteristic estimation portion 17 may be configured of a system on chip (e.g., so-called SoC device) that integrates a ROM and a RAM.

The driver characteristic estimation portion 17 includes, as functional blocks, a driver authentication portion 171, a travel environment determination portion 172, a skill evaluation portion 173, an emotion evaluation portion 174, a setting change portion 175, and a restriction determination portion 176. The aforementioned functional blocks are configured by executing a program stored in an unillustrated ROM by the driver characteristic estimation portion 17.

The storage 18 stores authentication information for authenticating the driver. The storage 18 of the embodiment stores, as authentication information, a user ID and a password that each driver sets in advance.

The storage 18 also stores characteristic information input from the controller 15, in association with the driver's identification information.

The driver authentication portion 171 performs authentication processing to authenticate the driver driving the motorcycle 10.

If the motorcycle 10 is a vehicle owned by an individual and the driver of the motorcycle 10 is the owner alone, the authentication processing may be omitted. Moreover, even when the motorcycle 10 is a vehicle owned by an individual, if multiple people drive the vehicle, or if the motorcycle 10 is a driving school vehicle used in a driving school or a motorcycle rented at a rental store, the driver may be authenticated by authentication processing performed by the driver authentication portion 171.

Identification information for identifying the driver is set for a driver of the motorcycle 10. The embodiment describes an exemplar case where a user ID and a password are used as the identification information. In addition, when the motorcycle 10 is a vehicle owned by an individual and the owner alone drives the motorcycle 10, the chassis number of the motorcycle 10 may be used as the identification information. Instead, biometric information on the driver such as the iris and finger prints may be used as the identification information.

The driver inputs identification information into the driving assistance device 100 before driving the motorcycle 10. If the configuration of the motorcycle 10 includes the operating portion 123, the operating portion 123 may be operated to input identification information such as a user ID and a password. Instead, the driver may carry a communication device such as a tag storing identification information, and the motorcycle 10 may be configured to input identification information on the driver by radio communication between the communication device and short-range radio communication portion (not shown) provided in the motorcycle 10.

Instead, a storage storing identification information may be provided in a key of the motorcycle 10, and the motorcycle 10 may be configured to acquire identification information from the key when the key is inserted into a key cylinder. In this case, if multiple people drive the motorcycle 10, each driver needs to carry a key storing identification information.

Instead, a face image of the driver and identification information may be prestored in association with each other in the storage 18, and the authentication portion 171 may be configured to perform face authentication by use of an image picked up by the onboard camera 122 and read out the identification information corresponding to the authenticated face image from the storage 18.

When identification information is input from the controller 15, the driver authentication portion 171 performs authentication processing. The driver authentication portion 171 determines whether authentication information that coincides with the input identification information is stored in the storage 18, and determines whether the driver is a driver allowed to drive the motorcycle 10.

If authentication information that coincides with the identification information is stored in the storage 18, the driver authentication portion 171 determines that the authentication has succeeded, and transmits a signal allowing start of the engine to the controller 15. Meanwhile, if authentication information that coincides with the identification information is not stored in the storage 18, the driver authentication portion 171 determines that the authentication has failed, and does not transmit a signal allowing start of the engine to the controller 15. Instead, the driver authentication portion 171 may transmit a signal prohibiting driving of the motorcycle 10 to the controller 15, or may display, on the display panel 137, that the driver is not registered as a driver allowed to drive the motorcycle 10, and display, on the display panel 137, a message inquiring whether to perform driver registration.

If the authentication succeeds, the driver authentication portion 171 outputs the identification information on the driver to the skill evaluation portion 173 and the emotion evaluation portion 174.

The travel environment determination portion 172 determines the travel environment in which the motorcycle 10 travels. The travel environment determination portion 172 receives, from the controller 15 as information for determining the travel environment in which the motorcycle 10 travels, traffic information and map information (including road type and topographic information), picked up images, weather information, the detected value of the six-axis sensor 118, and the detected value of the brake sensor 114, for example. Picked up images are images picked up by the onboard camera 122, and are picked up images of the road surface on which the motorcycle 10 travels.

The travel environment determination portion 172 determines the travel environment of the motorcycle 10 on the basis of the input information. For example, the travel environment determination portion 172 refers to a picked up image of the road surface to determine whether the road surface is wet. The travel environment determined by the travel environment determination portion 172 includes whether it is raining, whether it is snowing, whether there is traffic congestion, whether the road is a highway or an ordinary road, whether the road width is narrower than a predetermined width, whether there are more than a predetermined number of lanes, whether it is an uphill lane, whether it is a downhill lane, and whether it is a corner, for example. The travel environment determination portion 172 may determine that it is a corner on the basis of map information, or may determine that it is a corner on the basis of the detected value of the six-axis sensor 118.

The travel environment determination portion 172 outputs information (hereinafter referred to as environment information) indicating the determined travel environment of the motorcycle 10 to the skill evaluation portion 173 and the emotion evaluation portion 174.

The skill evaluation portion 173 receives, from the controller 15, information indicating the operation state of the accelerator and the brake, and information indicating behaviors of the engine and the suspension. The skill evaluation portion 173 evaluates characteristics of the driver on the basis of the input information. Characteristics of the driver are the skill of the driver when he/she drives the motorcycle 10, and emotions occurring during driving. The skill evaluation portion 173 evaluates the technique of driving (hereinafter referred to as skill) the motorcycle 10 as one characteristic of the driver.

Figure 2:
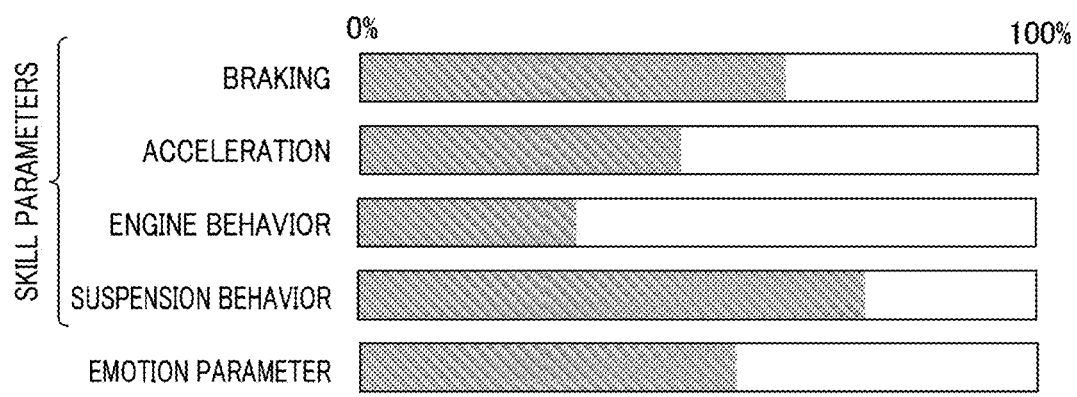
FIG. 2 is a diagram showing skill parameters and an emotion parameter.

FIG. 2 is a diagram showing skill parameters and an emotion parameter.

The skill evaluation portion 173 sets, as one characteristic of the driver, values of parameters (hereinafter referred to as skill parameters) indicating evaluation values of the driver's skills. In the description of the embodiment, four skill parameters including braking, acceleration, engine behavior, and suspension behavior are used as examples of skill parameters. However, the number of skill parameters is not limited to four, and parameters evaluating other skills of the driver may be set as well. The skill parameter is a parameter that varies between 0% and 100%, for example, the higher the evaluation value of the skill of the driver (driver has skill), the higher the value of the parameter is set.

The skill evaluation portion 173 receives, from the controller 15 as information indicating the operation state of braking, information on brake pressure, and information indicating whether ABS control is performed. The skill evaluation portion 173 evaluates the driver's braking skill on the basis of the input information, and sets the skill parameter indicating the evaluated value.

For example, the skill evaluation portion 173 calculates the rate of change of brake pressure on the basis of the input information on brake pressure, and uses the calculated rate of change of brake pressure as a preset threshold to evaluate the braking. For example, during a preset number of times of braking, or during braking within a preset period, if the rate of change of brake pressure is not detected to be larger than a preset threshold, the skill evaluation portion 173 evaluates positively, and if the rate of change of brake pressure is detected to be larger than the threshold, the skill evaluation portion 173 evaluates negatively.

If ABS control is performed, the skill evaluation portion 173 evaluates the driver's braking negatively. Meanwhile, if ABS control is not performed for a preset period, the skill evaluation portion 173 evaluates the driver's braking positively.

For example, when the driver is to stop the motorcycle 10, acceleration, braking amount, and brake pressure of the motorcycle 10 differ between cases of: driving gently by letting go of the accelerator at an early stage to coast, and using the foot brake at the end; and driving violently by pressing down the accelerator until immediately before the stopping position, and then immediately braking. Hence, the skill evaluation portion 173 determines whether the driver has driven violently on the basis of the braking amount and brake pressure detected by the brake sensor 114, and evaluates the braking and acceleration.

The skill evaluation portion 173 stores the set skill parameter of braking, in association with the driver's identification information and environment information, in the storage 18. That is, the skill evaluation portion 173 stores, in the storage 18, the skill parameter as the braking skill of the driver indicated by the identification information in the travel environment indicated by the environment information.

The skill evaluation portion 173 also receives, from the controller 15 as information for evaluating the driver's acceleration, information on vehicle speed, information on the accelerator position, location information, map information such as the road type and topographic information, traffic information, information indicating the detected value of the six-axis sensor 118, and information indicating whether traction control is performed. Traction control refers to control in which, while the contacting state between a tire and a road surface is monitored, when slip of a drive wheel is detected at the time of starting or acceleration, a brake is applied on the drive wheel or engine output is reduced to suppress slip of the tire. The skill evaluation portion 173 evaluates the driver's acceleration skill on the basis of the input information, and sets the skill parameter indicating the evaluated value.

For example, the skill evaluation portion 173 determines the road type (e.g., ordinary road or highway) of the road on which the motorcycle 10 travels, the road state (straight, curve, gradient), traffic state such as whether there is traffic congestion (hereinafter, these conditions are collectively referred to as traveling condition), for example, on the basis of information such as location information, map information, and traffic information. The skill evaluation portion 173 determines whether the motorcycle 10 is traveling at a vehicle speed or accelerator position corresponding to the determined traveling condition. If it is determined that the motorcycle 10 is traveling at the vehicle speed or accelerator position corresponding to the traveling condition, the skill evaluation portion 173 evaluates the driver's acceleration positively. Meanwhile, if it is determined that the motorcycle 10 is not traveling at the vehicle speed or accelerator position corresponding to the traveling condition, the skill evaluation portion 173 evaluates the driver's acceleration negatively.

The skill evaluation portion 173 also detects the pitch angle, which is the inclination angle of the motorcycle 10 in the longitudinal direction, on the basis of the detected value of the six-axis sensor 118. The skill evaluation portion 173 determines whether the motorcycle 10 pitches, on the basis of the detected pitch angle. Pitching refers to inclination of the motorcycle 10 in the longitudinal direction due to acceleration or braking. If it is determined that pitching occurs, the skill evaluation portion 173 evaluates the driver's acceleration negatively. Meanwhile, if pitching of the motorcycle 10 is not detected for a preset period, the skill evaluation portion 173 evaluates the driver's acceleration positively.

In addition, if it is determined that traction control is performed on the basis of information indicating whether traction control is performed, the skill evaluation portion 173 evaluates the driver's acceleration negatively. Meanwhile, if it is determined that traction control is not performed for a preset period, the skill evaluation portion 173 evaluates the driver's acceleration positively.

The skill evaluation portion 173 stores the set skill parameter of acceleration, in association with the driver's identification information and environment information, in the storage 18. That is, the skill evaluation portion 173 stores, in the storage 18, the skill parameter as the acceleration skill in the travel environment indicated by the environment information of the driver indicated by the identification information.

The skill evaluation portion 173 also receives, as information for evaluating engine behavior, information indicating engine speed, information indicating vehicle speed, and information indicating the shift position.

The skill evaluation portion 173 evaluates engine behavior on the basis of the input information, and sets the skill parameter indicating the evaluated value.

For example, if the engine speed is an engine speed corresponding to the shift position or the vehicle speed, the skill evaluation portion 173 evaluates the driver's driving positively. Meanwhile, if the engine speed is not an engine speed corresponding to the shift position or the vehicle speed, the skill evaluation portion 173 evaluates the driver's driving negatively.

The skill evaluation portion 173 stores the set skill parameter of engine behavior, in association with the driver's identification information and environment information, in the storage 18. That is, the skill evaluation portion 173 stores, in the storage 18, the skill parameter as the engine behavior in the travel environment indicated by the environment information of the driver indicated by the identification information.

The skill evaluation portion 173 also receives, as information for evaluating suspension behavior, acceleration information, information indicating the brake operation amount, and vehicle speed information. The skill evaluation portion 173 evaluates suspension behavior on the basis of the input information, and sets the skill parameter indicating the evaluated value.

For example, the skill evaluation portion 173 determines whether a stroke amount of the suspension at the time of braking changes more largely than a preset amount, on the basis of acceleration information and information indicating the brake operation amount. If the stroke amount of the suspension changes more largely than a preset threshold, the skill evaluation portion 173 evaluates the driver's driving negatively. Meanwhile, if the state where the stroke amount of the suspension changes more largely than the preset amount is not detected for a preset period, the skill evaluation portion 173 evaluates the driver's driving positively.

The skill evaluation portion 173 also determines whether the rate of change (rate of change per unit time) of the stroke amount of the suspension is larger than a preset threshold. If the rate of change of the stroke amount is larger than the threshold, the skill evaluation portion 173 evaluates the driver's driving negatively. Meanwhile, if the state where the rate of change of the stroke amount is larger than the threshold is not detected for a preset period, the skill evaluation portion 173 evaluates the driver's driving positively.

The skill evaluation portion 173 stores the set skill parameter of suspension behavior, in association with the driver's identification information and environment information, in the storage 18. That is, the skill evaluation portion 173 stores, in the storage 18, the skill parameter as the suspension behavior in the travel environment indicated by the environment information of the driver indicated by the identification information.

The emotion evaluation portion 174 detects and evaluates the driver's emotion or change in emotion as one characteristic of the driver.

The emotion evaluation portion 174 receives, from the controller 15 as biometric information, information indicating the driver's heart rate, blood pressure, respiratory frequency, sweat amount, and body temperature, for example. The emotion evaluation portion 174 also receives images picked up by the onboard camera 122. The emotion evaluation portion 174 also receives sound information on the driver input from the microphone. The emotion evaluation portion 174 evaluates the driver's emotion or change in emotion on the basis of the above information, and sets a parameter (hereinafter referred to as emotion parameter) indicating the evaluated value.

The emotion evaluation portion 174 sets the emotion parameter as one characteristic of the driver. As shown in FIG. 2, as in the case of the skill parameters, the emotion parameter, too, is a parameter that varies between 0% and 100%. Moreover, the emotion parameter is set on the basis of, among the driver's emotions that occur while driving, the time when emotions appropriate for driving occur, the time when emotions inappropriate for driving occur, and the frequency of switching between the emotions appropriate for driving and the emotions inappropriate for driving, for example.

For example, the emotion evaluation portion 174 performs image processing on input picked up image data, to determine the driver's facial expression. The expressions determined by the emotion evaluation portion 174 include "joy," "sorrow," "anger," "surprise," "fear," and "hard," for example. The storage 18 stores feature amount information indicating the position or relative position of face organs (e.g., eyes, nose, and mouth) for each of the expressions (hereinafter referred to as sample expression) "joy," "sorrow," "anger," "surprise," "fear," and "hard," for example.

The emotion evaluation portion 174 identifies the position or relative position of the driver's face organ from an input picked up image. The emotion evaluation portion 174 compares the identified position or relative position of the face organ with the feature amount information of each sample expression stored in the storage 18, and calculates the similarity between the driver's expression and the sample expression. The emotion evaluation portion 174 determines the driver's facial expression on the basis of the calculated similarity.

The emotion evaluation portion 174 determines an overall emotion of the driver on the basis of the determined driver's facial expression, biometric information detected by the biometric sensor 125, and the sound information on the driver input from the microphone, for example.

Next, the emotion evaluation portion 174 evaluates the driver's emotion on the basis of the determined driver's emotion or change in emotion, and sets the value of the emotion parameter.

For example, the emotion evaluation portion 174 obtains the sum of the time when it is determined that the driver's emotion is a preset emotion. The emotion evaluation portion 174 sets the value of the emotion parameter on the basis of the proportion of the obtained time in a preset time period. The preset time period may be one trip (from when ignition switch is turned on to when it is turned off), one day, or one month, for example. Additionally, the preset emotion includes positive emotions such as "fun," "comfortable," "exciting," and emotions such as calm and relaxed. The emotion evaluation portion 174 identifies the above emotions as being emotions appropriate for driving.

Instead, the emotion evaluation portion 174 may identify emotions such as "afraid" and "hard" as being emotions inappropriate for driving, and set the value of the emotion parameter on the basis of the proportion of these emotions in the preset time period.

The emotion evaluation portion 174 stores the set emotion parameter, in association with the driver's identification information and environment information, in the storage 18. That is, the emotion evaluation portion 174 stores, in the storage 18, the emotion parameter as the emotion of the driver indicated by the identification information in the travel environment indicated by the environment information.

Additionally, the emotion evaluation portion 174 may set the value of the emotion parameter, by taking into account the number of times of switching between an emotion appropriate for driving and an emotion inappropriate for driving within a preset time period.

For example, in the case of a learner driver or a driver that cannot concentrate on driving, switching between an emotion appropriate for driving and an emotion inappropriate for driving may occur frequently according to changes in the surrounding environment of the motorcycle 10. Hence, the emotion evaluation portion 174 may set the emotion parameter by taking into account the number of times of switching between an emotion appropriate for driving and an emotion inappropriate for driving.

The emotion evaluation portion 174 may also change setting of the emotion parameter according to the proportion of time when an emotion unrelated to driving occurs.

Figure 3:
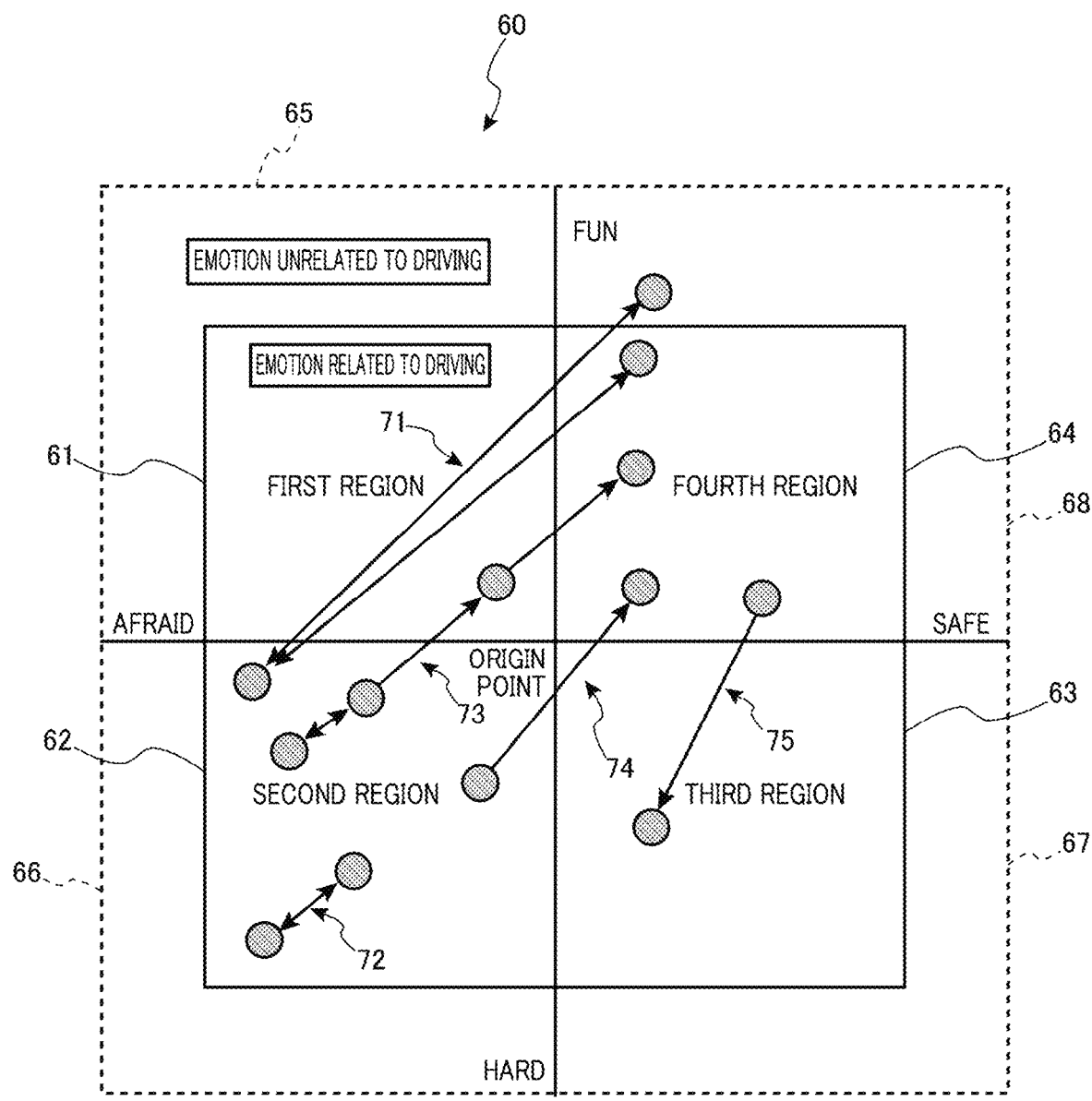
FIG. 3 is a diagram showing a map in which a driver's emotions or change in emotions are grouped into regions appropriate for driving and regions inappropriate for driving.

FIG. 3 is a diagram showing a map in which the driver's emotions or changes in emotion are grouped into regions appropriate for driving and regions inappropriate for driving.

The emotion evaluation portion 174 may set the emotion parameter by use of a map 60 shown in FIG. 3. The map 60 shown in FIG. 3 is divided into four regions by a vertical axis and a horizontal axis. Along the vertical axis, the driver's emotion "fun" is associated with the upper side of the origin point, and the driver's emotion "hard" is associated with the lower side of the origin point. Meanwhile, along the horizontal axis, the emotion "safe" is associated with the right side of the origin point, and the emotion "afraid" is associated with the left side of the origin point.

Hereinafter, a region on the map 60 partitioned by the emotion "fun" on the vertical axis and the emotion "afraid" on the horizontal axis is referred to as a first region 61. A region on the map 60 partitioned by the emotion "hard" on the vertical axis and the emotion "afraid" on the horizontal axis is referred to as a second region 62. A region on the map 60 partitioned by the emotion "hard" on the vertical axis and the emotion "safe" on the horizontal axis is referred to as a third region 63. A region on the map 60 partitioned by the emotion "fun" on the vertical axis and the emotion "safe" on the horizontal axis is referred to as a fourth region 64.

A region on the map 60 partitioned by the emotion "fun" on the vertical axis and the emotion "afraid" on the horizontal axis outside the first region 61 is referred to as a fifth region 65.

A region on the map 60 partitioned by the emotion "hard" on the vertical axis and the emotion "afraid" on the horizontal axis outside the second region 62 is referred to as a sixth region 66.

A region on the map 60 partitioned by the emotion "hard" on the vertical axis and the emotion "safe" on the horizontal axis outside the third region 63 is referred to as a seventh region 67.

A region on the map 60 partitioned by the emotion "fun" on the vertical axis and the emotion "safe" on the horizontal axis outside the fourth region 64 is referred to as an eighth region 68.

The fifth region 65, the sixth region 66, the seventh region 67, and the eighth region 68 are regions where the driver has emotions unrelated to driving.

The determination on whether the driver's emotion is an emotion related to driving or an emotion unrelated to driving may be made on the basis of the driver's line of sight detected on the basis of an image picked up by the onboard camera 122, for example. For example, if the driver's line of sight is pointed in the traveling direction of the motorcycle 10, it may be determined that the driver is concentrating on driving, and the driver's emotion is an emotion related to driving. Meanwhile, if the driver's line of sight is pointed in a direction other than the traveling direction of the motorcycle 10, it may be determined that the driver is not concentrating on driving, and the driver's emotion is an emotion unrelated to driving.

If the driver's emotion is located in the first region 61, it is determined that the driver's driving does not match his/her skill, or the driving is careless.

If the driver's emotion is located in the second region 62, it is determined that the driver is in an emotional state inappropriate for driving, such as "hard" and "afraid."

If the driver's emotion is located in the third region 63, it is determined that the driver is driving from habit due to fatigue or the like.

If the driver's emotion is located in the fourth region 64, it is determined that the driver is driving with an emotion appropriate for driving.

Sometimes, even when the driver's emotion is located in the fourth region 64, the driver may be caught off guard or an emotion unrelated to driving may occur. In this case, as indicated by arrow 71 of FIG. 3, the emotion often changes between emotions "fun" and "afraid." Hence, when an emergency operation for avoiding danger is detected, the driver characteristic estimation portion 17 may determine that the driver is not concentrating on driving, and change the value of the emotion parameter to the negative side. The emotion "fun" may be an emotion located in the fourth region 64, or may be an emotion located in the eighth region 68. That is, the emotion "fun" may be related to driving, or the emotion "fun" may be unrelated to driving.

As indicated by arrow 72 of FIG. 3, when the driver's emotion repeatedly changes within the second region 62, it is highly likely that the setting of the motorcycle 10 does not suit the driver. In this case, the driver characteristic estimation portion 17 may instruct the controller 15 to display a prompt to change the setting of the motorcycle 10, on the display panel 137.

As indicated by arrow 73 of FIG. 3, when the driver's emotion changes from the state of repeatedly changing within the second region 62 to occurrence of the emotion "fun," and the driver's emotion moves to the first region 61 or the fourth region 64, the driver characteristic estimation portion 17 may determine that driver is used to driving the motorcycle 10, or the driver's skill has improved, and change the driver's skill parameter.

As indicated by arrow 74 of FIG. 3, even when the driver's emotion is classified into the second region 62, if it is determined that the driving is not reckless on the basis of the detected value of the sensor portion 11, and that the driver is driving safely while being cautious due to bad weather, for example, the driver characteristic estimation portion 17 may change the driver's skill parameter to a positive evaluation, or change the emotion parameter to a positive evaluation. Meanwhile, if it is determined that the driving is reckless on the basis of the detected value of the sensor portion 11, and that the driver is not driving safely due to bad weather, the driver characteristic estimation portion 17 may change the skill parameter to a negative evaluation, or change the emotion parameter to a negative evaluation.

As indicated by arrow 75 of FIG. 3, when the emotion changes from the fourth region 64 to "hard," the driver characteristic estimation portion 17 may determine that the degree of concentration is lowered from long hours of driving, and change the skill parameter to a negative evaluation, or change the emotion parameter to a negative evaluation.

Moreover, while the driver characteristic estimation portion 17 generates the skill parameter and the emotion parameter in the above example, a parameter indicating the driver's driving tendencies may be added. Examples of driving tendencies include driving tendencies toward safe driving, and driving tendencies related to the travel route. As driving tendencies toward safe driving, the driver characteristic estimation portion 17 may detect the spacing between vehicles, the number of times of crossing lanes, the number of times of sudden starting, and the number of times of sudden acceleration, for example, and generate a parameter indicating driving tendencies on the basis of these pieces of detected information. As driving tendencies related to the travel route, the driver characteristic estimation portion 17 may generate a parameter indicating driving tendencies on the basis of the proportion of selecting and traveling roads with many curves such as a mountain pass, or the proportion of selecting and traveling highways, to the entire traveling path, for example.

The setting change portion 175 performs setting of various control performed by the controller 15, on the basis of the driver's characteristics evaluated by the skill evaluation portion 173 and the emotion evaluation portion 174. Specifically, the setting change portion 175 sets the value of control parameters used by the controller 15 to control the actuator 13.

The setting change portion 175 reads out a skill parameter and an emotion parameter from the storage 18, and calculates an evaluation value on the basis of the read out skill parameter and emotion parameter. More specifically, the setting change portion 175 multiplies the skill parameter and the emotion parameter by a preset weighting factor, and calculates the sum of the multiplication results as an evaluation value.

FIG. 4 shows an example of a configuration of a table (hereinafter referred to as factor table) in which weighting factors are registered.

The factor table is a table where weighting factors by which to multiply the skill parameters and the emotion parameter are registered for each control target to be controlled by the controller 15. While the embodiment uses engine output, suspension setting, and ABS activation timing as the control targets, the control target of the controller 15 is not limited to these.

The factor table shown in FIG. 4 may be provided for each travel environment determined by the travel environment determination portion 172, or a single table may be used irrespective of the travel environment.

First, the setting change portion 175 reads out the skill parameter of each of the braking, acceleration, engine behavior, and suspension behavior calculated for each travel environment from the storage 18. Next, the setting change portion 175 calculates a mean value of the skill parameters calculated for the travel environments.

For example, the setting change portion 175 calculates the mean value of the skill parameter of braking by adding a skill parameter evaluating braking during cornering, a skill parameter evaluating braking in the rain, a skill parameter evaluating braking in fine weather, and a skill parameter evaluating braking while traveling downhill, for example. The setting change portion 175 calculates a mean value of skill parameters in a similar manner for the skill parameters of acceleration, engine behavior, and suspension behavior. The mean value may be a simple average, or may be a weighted average calculated by weighting the skill parameters according to the travel environment.

Next, the setting change portion 175 calculates the evaluation value for each control target by use of the skill parameter, the emotion parameter, and the weighting factor registered in the factor table.

If the control target is engine output, for example, the setting change portion 175 multiplies the skill parameter of acceleration by weighting factor A (%), multiplies the skill parameter of engine behavior by weighting factor B (%), multiplies the total value by weighting factor E (%), and multiplies the emotion parameter by weighting factor F (%). The setting change portion 175 calculates the sum of these multiplied values as the evaluation value of engine output. The total value is the sum of the values of the skill parameters of braking, acceleration, engine behavior, and suspension behavior.

If the control target is the suspension, for example, the setting change portion 175 multiplies the skill parameter of braking by weighting factor C (%), multiplies the skill parameter of suspension behavior by weighting factor D (%), and multiplies the total value by weighting factor E (%). The setting change portion 175 calculates the sum of these multiplied values as the evaluation value for the suspension setting.

If the control target is the ABS activation timing, for example, the setting change portion 175 multiplies the skill parameter of braking by weighting factor B (%), multiplies the skill parameter of suspension behavior by weighting factor C (%), multiplies the total value by weighting factor E (%), and multiplies the emotion parameter by weighting factor F (%). The setting change portion 175 calculates the sum of these multiplied values as the evaluation value for setting the ABS activation timing.

Next, the setting change portion 175 compares the calculated evaluation value with a preset threshold, and sets the value of a control parameter for controlling the corresponding control target on the basis of the comparison result.

The threshold is prepared for each of the control targets such as the engine output, suspension setting, and ABS activation timing.

Instead, multiple thresholds may be prepared according to the travel environment. For example, as thresholds corresponding to engine output, multiple thresholds may be prepared according to travel environments when the travel environment is an ordinary road or a highway, when the road surface is wet, when there is traffic congestion, when it is uphill, and when it is downhill, for example.

For example, assume that three thresholds threshold a, threshold b, and threshold c are prepared as thresholds when the control target is control of engine output. The engine output is set according to each threshold. For example, assume that the value of threshold a is "30" and engine output is "50%," the value of threshold b is "60" and engine output is "75%," and the value of threshold c is "95" and engine output is "100%."

In this case, the setting change portion 175 compares the calculated evaluation value of engine output with the threshold a, threshold b, and threshold c. For example, if the evaluation value of engine output is not smaller than threshold c, the setting change portion 175 sets the value of control parameter for controlling engine output to "100%." That is, the setting change portion 175 sets the control parameter so that the motorcycle 10 can exert 100% engine output.

If the evaluation value of engine output is smaller than threshold c and not smaller than threshold b, the setting change portion 175 sets the value of control parameter for controlling engine output to "75%." That is, the setting change portion 175 sets the value of control parameter so that the engine output can be performed by 75%.

If the evaluation value of engine output is smaller than threshold b and not smaller than threshold a, the setting change portion 175 sets the control parameter for controlling engine output to "50%." That is, the setting change portion 175 sets the value of control parameter so that the engine output can be performed by 50%.

If the evaluation value of engine output is smaller than threshold a, the setting change portion 175 sets the control parameter for controlling engine output to a value not larger than "50%." That is, the setting change portion 175 sets the value of control parameter so that the engine output can be performed by not larger than 50%.

The setting change portion 175 stores the set value of control parameter, in association with the corresponding driver's identification information, in the storage 18. The setting change portion 175 also outputs the set control parameter to the controller 15. The controller 15 controls engine output according to the control parameter input from the driver characteristic estimation portion 17, and adjusts setting of the suspension and ABS activation timing.

While the above description uses engine output, suspension setting, and ABS activation timing as examples of the control targets (various control) set by the setting change portion 175, the control target is not limited to these, and setting of other control targets may be changed on the basis of the skill parameters and emotion parameter.

The restriction determination portion 176 determines, in real-time, whether control of the actuator 13 needs to be restricted, on the basis of the travel environment determined by the travel environment determination portion 172 and the driver's emotion evaluated by the emotion evaluation portion 174.

For example, if it is determined by the travel environment determination portion 172 that the road surface is wetted by rain or the like, the restriction determination portion 176 instructs the controller 15 to restrict engine output. If it is determined by the emotion evaluation portion 174 that the driver's current emotion is an emotion unrelated to driving, the restriction determination portion 176 instructs the controller 15 to restrict engine output. Specifically, the restriction determination portion 176 outputs an instruction of 10% restriction of engine output to the controller 15.

If it is determined by the travel environment determination portion 172 that the road surface is wetted by rain or the like, the restriction determination portion 176 may instruct the controller 15 to change the setting of suspension and ABS activation timing. The restriction determination portion 176 instructs the controller 15 so that the settings of suspension and ABS activation timing become safer than before restriction.

Upon receipt of the instruction from the restriction determination portion 176, the controller 15 restricts engine output below the engine output set in the control parameter, and changes the setting of the suspension and ABS activation timing to become safer, according to the received instruction.

Figure 5:
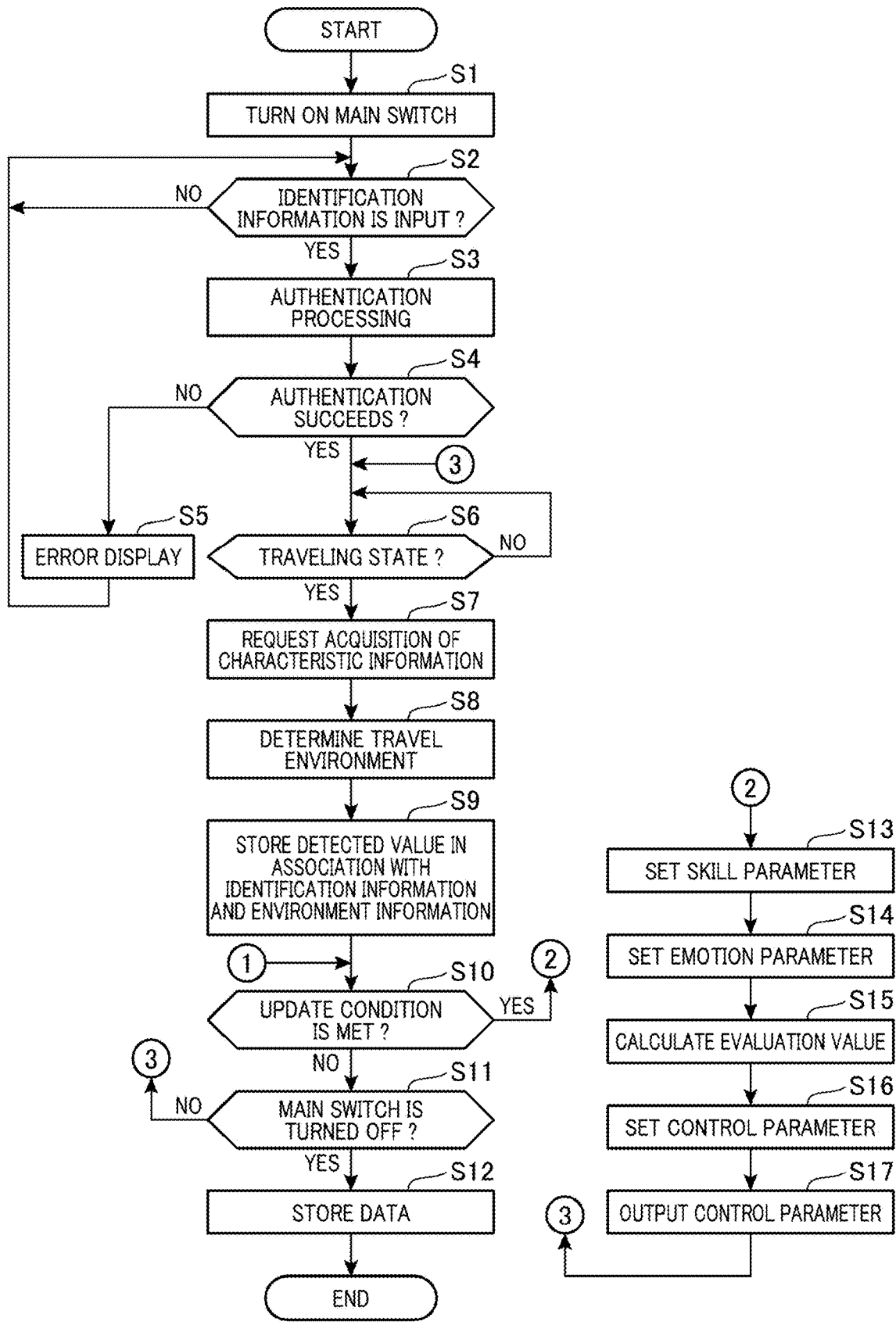
FIG. 5 is a flowchart showing an operation of a driver characteristic estimation portion.

FIG. 5 is a flowchart showing an operation of the embodiment. FIG. 5 is a flowchart showing an operation of the driver characteristic estimation portion 17 in particular.

First, when a main switch of the motorcycle 10 is turned on (step S1) and power supply is started, the driver characteristic estimation portion 17 determines whether identification information is input (step S2).

The driver of the motorcycle 10 operates the operating portion 123 to input a user ID and a password as identification information. The controller 15 outputs the identification information received by the operating portion 123 to the driver characteristic estimation portion 17. Note that identification of the driver is not limited to a user ID and a password, and may be done by face recognition or vein recognition of the driver.

When there is no input of identification information (step S2/NO), the driver characteristic estimation portion 17 holds the start of processing until the input of identification information. Upon input of identification information (step S2/YES), the driver characteristic estimation portion 17 determines whether the input identification information coincides with authentication information stored in the storage 18 and performs authentication processing (step S3). If the authentication fails (step S4/NO), that is, if authentication information that coincides with the input identification information is not stored in the storage 18, the driver characteristic estimation portion 17 displays that the authentication has failed on the display panel 137 (step S5), and proceeds to the determination of step S2. The driver characteristic estimation portion 17 also counts the number of failed authentications, and when the counted number of times reaches a preset number, may stop the authentication processing and not allow start of the engine.

If the authentication succeeds (step S4/YES), the driver characteristic estimation portion 17 allows the controller 15 to start the engine. Thereafter, the driver characteristic estimation portion 17 determines whether the motorcycle 10 is in a traveling state on the basis of the detected value of the sensor of the vehicle speed sensor 116 and other parts (step S6). If it is determined that the motorcycle 10 is not in a traveling state (step S6/NO), the driver characteristic estimation portion 17 continues to determine whether the motorcycle 10 is in a traveling state on the basis of the detected value of the sensor.

If it is determined that the motorcycle 10 is in a traveling state (step S6/YES), the driver characteristic estimation portion 17 requests the controller 15 to acquire characteristic information (step S7). Upon input of characteristic information from the controller 15, the driver characteristic estimation portion 17 retrieves the detected value of the sensor, a picked up image, traffic information, and map information from the input characteristic information, and determines the travel environment of the motorcycle 10 on the basis of the retrieved information (step S8). The driver characteristic estimation portion 17 generates environment information indicating the determined travel environment. After determining the travel environment, the driver characteristic estimation portion 17 stores the acquired characteristic information, in association with the identification information and environment information, in the storage 18 (step S9).

Next, the driver characteristic estimation portion 17 determines whether a control parameter update condition is met (step S10). Examples of the update condition include completion of collection of characteristic information in each travel environment, stoppage of the motorcycle 10, and the elapse of a predetermined time or more from the last change of the control parameter, for example. If the update condition is not met (step S10/NO), the driver characteristic estimation portion 17 determines whether the main switch is turned off (step S11). If the main switch is not turned off (step S11/NO), the driver characteristic estimation portion 17 returns to the determination in step S6, and repeats the processing of steps S6 to S11. If the main switch is turned off (step S11/YES), the driver characteristic estimation portion 17 stores unstored characteristic information and data in the storage 18 (step S12), and ends the processing flow.

If the update condition is met (step S10/YES), the driver characteristic estimation portion 17 reads out the characteristic information classified for each environment information from the storage 18, and evaluates the driver's skill for each travel environment on the basis of the read out characteristic information. The driver characteristic estimation portion 17 sets a value of the skill parameter indicating the evaluation result of the driver's skill for each travel environment (step S13).

The driver characteristic estimation portion 17 also retrieves biometric information, sound information on the driver, and picked up images of the driver's face from the characteristic information, and evaluates the driver's emotion during driving on the basis of these pieces of information. The driver characteristic estimation portion 17 sets a value of the emotion parameter indicating the evaluation result of emotion for each travel environment (step S14).

Next, the driver characteristic estimation portion 17 calculates a mean value of the skill parameters set for each travel environment. That is, the driver characteristic estimation portion 17 calculates a mean value of the skill parameters in each travel environment for each of braking, acceleration, engine behavior, and suspension behavior. The driver characteristic estimation portion 17 also calculates a mean value of the emotion parameters set for each travel environment.

Next, the driver characteristic estimation portion 17 calculates the evaluation value on the basis of the calculated mean value of the skill parameters and the emotion parameters, and the weighting factors registered in the factor table (step S15).

After calculating the evaluation value for each travel environment, the driver characteristic estimation portion 17 compares the evaluation value and a threshold corresponding to the travel environment to set the value of control parameter (step S16).

After setting the control parameter, the driver characteristic estimation portion 17 outputs the set control parameter to the controller 15 (step S17).

Upon receipt of the control parameter from the driver characteristic estimation portion 17, the controller 15 updates the value of control parameter. The value of control parameter is preferably updated when the motorcycle 10 is stopped, a message inquiring whether to update the control parameter is displayed on the display panel 137, and an operation allowing the update is received by the operating portion 123, for example.

After updating the value of control parameter, the controller 15 acquires environment information from the travel environment determination portion 172. The controller 15 uses a control parameter corresponding to the travel environment indicated by the acquired environment information, to control the fuel injection device 132, the ignition device 133, the brake device 135, and the suspension adjustment portion 136.

Figure 6:
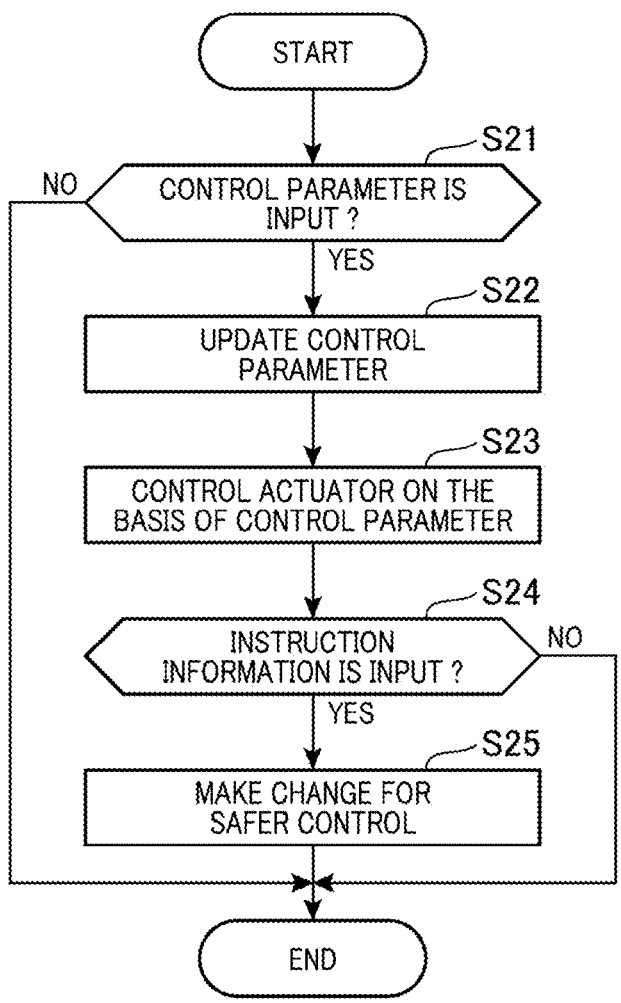
FIG. 6 is a flowchart showing an operation of a controller.

FIG. 6 is a flowchart showing an operation of the controller 15.

The controller 15 determines whether a control parameter is input from the driver characteristic estimation portion 17 (step S21). If the control parameter is not input (step S21/NO), the controller 15 ends the processing flow.

If the control parameter is input (step S21/YES), the controller 15 performs update processing in which the value of control parameter is overwritten with the input control parameter (step S22). The update processing is performed in a state where a motorcycle 10 is not traveling, such as immediately after turning off the main switch, or immediately after turning on the main switch.

The controller 15 controls the actuator 13 on the basis of the updated control parameter (step S23). The controller 15 also determines whether instruction information is input from the driver characteristic estimation portion 17 (step S24). If the instruction information is not input (step S24/NO), the controller 15 continues to control the actuator 13 according to the control parameter. Meanwhile, if the instruction information is input (step S24/YES), the controller 15 makes a change, so that the control of the actuator 13 becomes safer according to the input instruction information (step S25). For example, the controller 15 corrects the value of control parameter according to the instruction information, and controls engine output by the corrected control parameter. The controller 15 also sets the suspension and ABS activation timing to become safer according to the instruction information.

As has been described, the driving assistance device 100 of the first embodiment is the driving assistance device 100 that supports driving of a driver, and includes: the sensor portion 11 that detects a driving state of the motorcycle 10 by the driver; the navigation system 14, the onboard camera 122, the mobile communication portion 126, and the travel environment determination portion 172 that detect a travel environment in which the motorcycle 10 travels; and the headset 124, the biometric sensor 125, and the emotion evaluation portion 174 that detect the driver's emotion or change in emotion.

The driving assistance device (100, 300) includes: the skill evaluation portion 173 and the emotion evaluation portion 174 that estimate the driver's characteristic with respect to the motorcycle 10 on the basis of the driving state of the driver in the detected travel environment and the driver's emotion or change in emotion during driving; and the setting change portion 175 that changes the setting of various control in the motorcycle 10 on the basis of the driver's characteristic estimated by the skill evaluation portion 173 and the emotion evaluation portion 174.

According to this configuration, the driver's characteristic with respect to the motorcycle 10 is estimated on the basis of the driving state of the driver in the environment detected by the navigation system 14, the onboard camera 122, the mobile communication portion 126, and the travel environment determination portion 172, and the driver's emotion or change in emotion during driving, and the setting of various control in the motorcycle 10 is changed on the basis of the estimated driver's characteristic. Accordingly, the setting of various control of the motorcycle 10 can be set with high accuracy on the basis of the driving state of the driver in the environment and the driver's emotion or change in emotion.

The driver's characteristic is estimated by determining a skill parameter indicating the driver's driving skill on the basis of the driving state of the driver in multiple environments detected by the navigation system 14, the onboard camera 122, the mobile communication portion 126, and the travel environment determination portion 172.

According to this configuration, the driver's driving skill can be determined accurately on the basis of the driving states in multiple environments, whereby the estimation accuracy of the driver's characteristic can be improved.

The skill evaluation portion 173 and the emotion evaluation portion 174 determine whether the driver's emotion or change in emotion detected by the headset 124, the biometric sensor 125, and the emotion evaluation portion 174 that detect the emotion or change in emotion is an emotion or change in emotion that is appropriate for driving, and thereby estimate the driver's characteristic.

According to this configuration, the driver's characteristic can be estimated on the basis of the driver's emotion during driving.

The skill evaluation portion 173 and the emotion evaluation portion 174 determine the driver's driving tendency on the basis of the driving state of the driver in multiple environments detected by the navigation system 14, the onboard camera 122, the mobile communication portion 126, and the travel environment determination portion 172, and thereby estimates the driver's characteristic.

According to this configuration, the driver's driving skill can be determined accurately on the basis of the driving state in multiple environments, whereby the estimation accuracy of the driver's characteristic can be improved.

The emotion evaluation portion 174 estimates the driver's characteristic on the basis of a time when a preset emotion determined to be appropriate for driving appears in driving, or a time when a preset emotion determined to be inappropriate for driving appears in driving.

According to this configuration, the driver's characteristic is estimated on the basis of a time when an emotion determined to be appropriate for driving appears in driving, or a time when an emotion determined to be inappropriate for driving appears in driving. Hence, it is possible to estimate whether the driver is suited for driving on the basis of the driver's emotion that appears in driving.

The emotion evaluation portion 174 estimates the driver's characteristic on the basis of the frequency of emotion change from a preset emotion determined to be appropriate for driving to a preset emotion determined to be inappropriate for driving, or emotion change from a preset emotion determined to be inappropriate for driving to a preset emotion determined to be appropriate for driving. According to this configuration, the driver's characteristic is estimated on the basis of the frequency, during driving, of changing to an emotion determined to be appropriate for driving, and to an emotion determined to be inappropriate for driving. Hence, when the driver's emotion changes frequently, it may be determined that the driver lacks concentration, and the driver's characteristic is not suited for driving.

The restriction determination portion 176 changes the setting of various control according to the driver's emotion or change in emotion detected by the headset 124, the biometric sensor 125, and the emotion evaluation portion 174 when the driver starts driving, or is driving.

According to this configuration, the setting of various control is changed according to the driver's emotion or change in emotion at the start of driving or during driving. Hence, if the driver's emotion is an emotion inappropriate for driving, the setting of various control may be changed to allow safe travel of the motorcycle 10.

Second Embodiment

A second embodiment of the present invention will be described with reference to the accompanying drawings.

Figure 7:
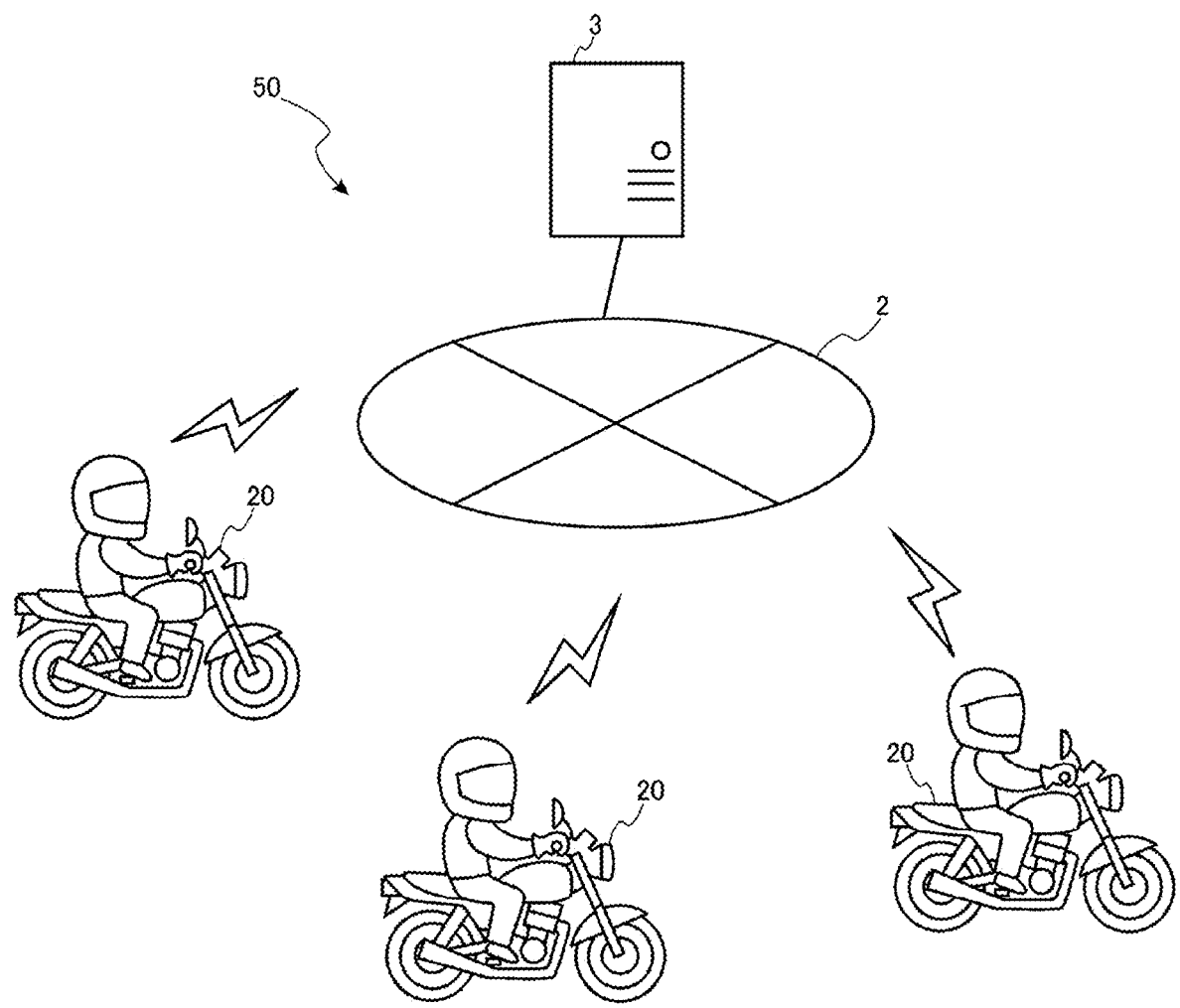
FIG. 7 is a configuration diagram showing a schematic configuration of a driving assistance system.

FIG. 7 is a configuration diagram showing a schematic configuration of a driving assistance system 50. The driving assistance system 50 includes multiple motorcycles 20 and a server device 3. The multiple motorcycles 20 and the server device 3 are connected through a network 2, and can exchange data. The network 2 is configured of the Internet, a dedicated communication line (e.g., CATV (community antenna television) line), a mobile communication network (including a base station or the like), a gateway, and other components, for example. While three motorcycles 20 are shown in FIG. 7, the number of motorcycles 20 is not limited.

Figure 8:
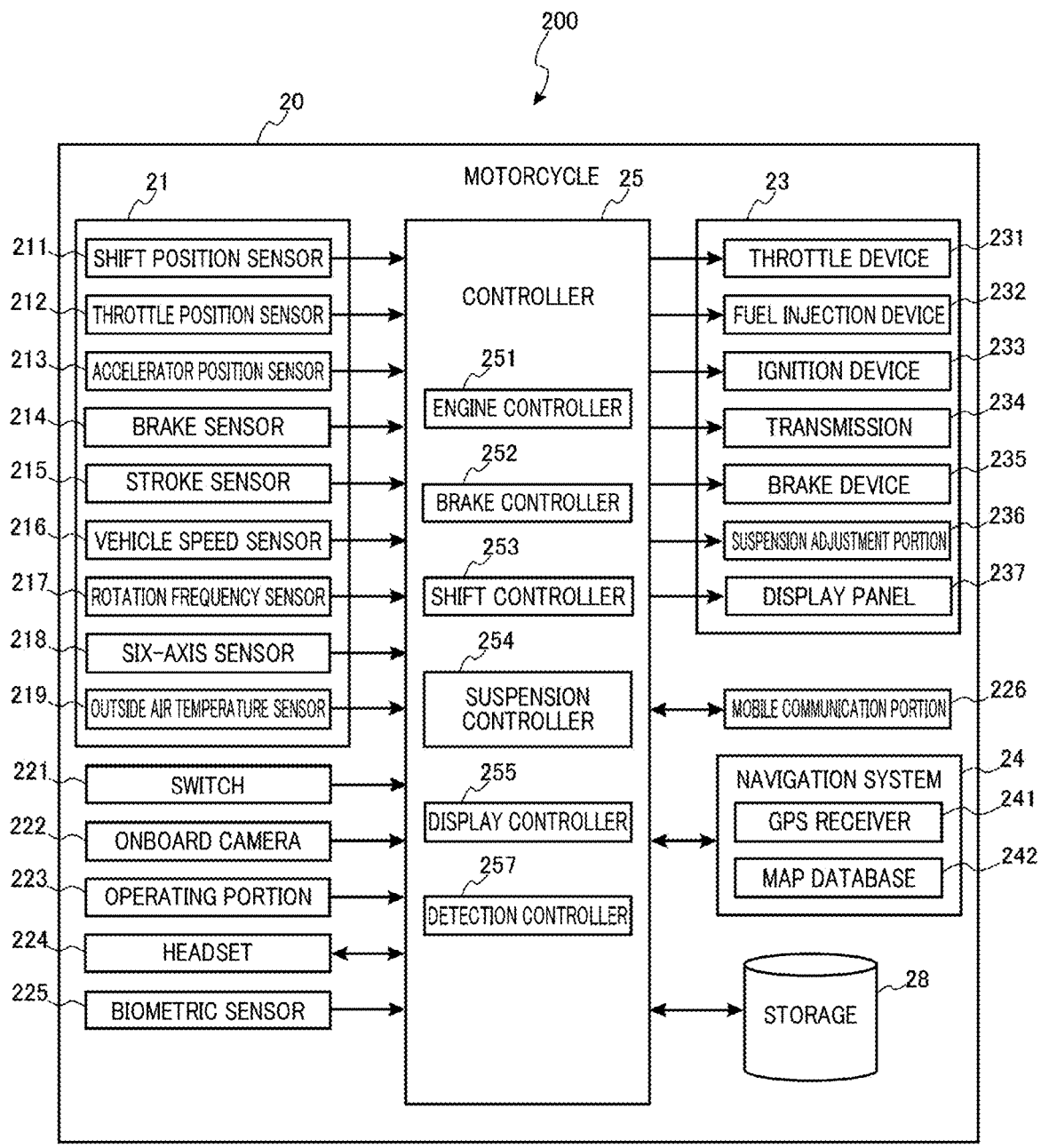
FIG. 8 is a block diagram showing a configuration of a motorcycle of a second embodiment.

FIG. 8 is a block diagram showing a configuration of the motorcycle 20 of the embodiment. An information detection device 200 is installed in the motorcycle 20 of the embodiment. The information detection device 200 differs from the driving assistance device 100 of the first embodiment shown in FIG. 1 in that it does not include the driver characteristic estimation portion 17. Additionally, a storage 28 connected to the driver characteristic estimation portion 17 in the first embodiment is connected to a controller 25 in the embodiment.

Additionally, the controller 25 of the embodiment includes a detection controller 257.

The storage 28 stores authentication information for identifying the driver of the motorcycle 20. As in the case of the storage 18 of the first embodiment, the storage 28 stores the detected value of a sensor portion 21, biometric information, sound information, picked up images, traffic information, map information, location information, weather information, and the like.

The detection controller 257 performs authentication processing on the basis of identification information received by an operating portion 223. When the operating portion 223 receives the identification information, the detection controller 257 determines whether authentication information that coincides with the received identification information is stored in the storage 28 and performs authentication processing.

If the authentication processing succeeds, the detection controller 257 stores the detected value of the sensor portion 21 and the like in the storage 28. The detection controller 257 determines whether the motorcycle 20 is in a traveling state on the basis of the detected value of a vehicle speed sensor 216, and when the motorcycle 20 is in a traveling state, stores the detected value input from the sensor portion 21, in association with time information indicating the time when the detected value was measured, in the storage 28. The information the detection controller 257 stores in the storage 28 includes not only the detected value of the sensor portion 21, but also biometric information input from a biometric sensor 225, picked up images input from an onboard camera 222, sound information on the driver input from a headset 224, and traffic information, map information, and location information acquired from a navigation system 24, for example. The information the detection controller 257 stores in the storage 28 includes traffic information and weather information downloaded from a network such as the Internet by controlling a mobile communication portion 226. The detection controller 257 stores these pieces of information, too, in association with acquisition time when the pieces of information were acquired, in the storage 28. Hereinafter, the detected value, biometric information, sound information, picked up images, traffic information, map information, location information, weather information, and acquisition time of these pieces of information are collectively referred to as characteristic information.

If an upload condition is met, the detection controller 257 transmits a connection request to the server device 3, and, in response to an authentication request from the server device 3, transmits the driver's identification information to the server device 3. If the authentication in the server device 3 succeeds, the detection controller 257 reads out characteristic information from the storage 28 and transmits the information to the server device 3.

Examples of the upload condition include completion of collection of characteristic information in each travel environment as mentioned above, stoppage of the motorcycle 20, and the elapse of a predetermined time or more from the last change of the control parameter, for example.

Figure 9:
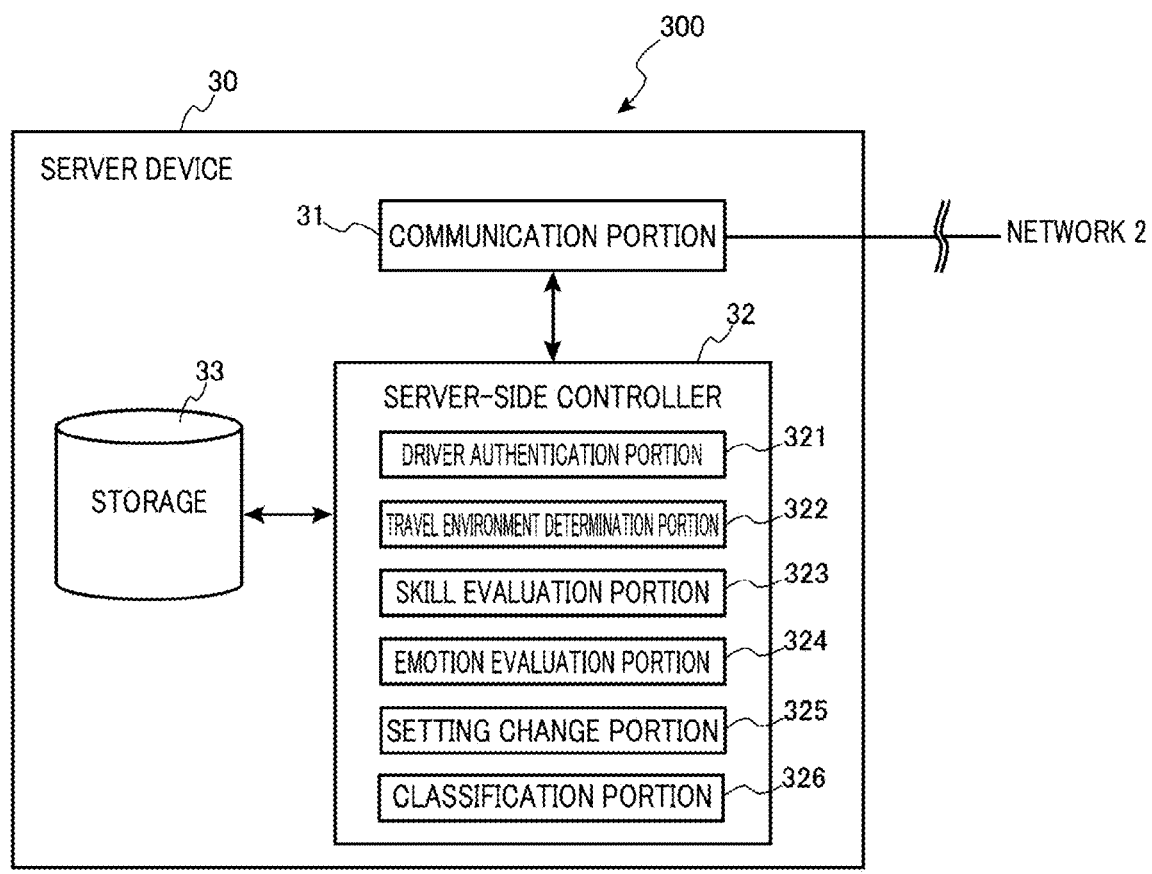
FIG. 9 is a block diagram showing a configuration of a server device.

FIG. 9 is a block diagram showing a configuration of the server device 3.

A driving assistance device 300 is installed in the server device 3, and the server device 3 operates as "server device" in the driving assistance system of the present invention. The server device 3 includes a communication portion 31, a server-side controller 32, and a storage 33.

The communication portion 31 is connected to network 2, and performs data communication under control of the server-side controller 32.

The server-side controller 32 is a processor that executes a program, and may be referred to as a processor. An integrated circuit, a microcontroller, a microcomputer, a programmable logic controller, an application specific integrated circuit, or another programmable circuit may be used as the server-side controller 32. The server-side controller 32 may be configured of a CPU (central processing unit), an MPU (micro processing unit), a microcomputer, or another arithmetic processing unit. Moreover, the server-side controller 32 may be configured of a system on chip (e.g., so-called SoC (system-on-a-chip) device) that integrates a ROM (read only memory) and a RAM (random access memory). The communication portion 31 and the storage 33 are connected to the server-side controller 32.

Examples of the storage 33 include a storage device using a magnetic recording medium such as an HDD (hard disk drive), and a storage device using a semiconductor memory such as an SSD (solid state drive), a flash ROM, and an SRAM (static RAM).

The storage 33 stores authentication information for authenticating the driver. The storage 33 also stores a map database. The map database is used to determine the road type and topography, for example, where the motorcycle 20 travels. The storage 33 also stores characteristic information transmitted from each motorcycle 20 for each piece of identification information.

The server-side controller 32 includes a driver authentication portion 321, a travel environment determination portion 322, a skill evaluation portion 323, an emotion evaluation portion 324, a setting change portion 325, and a classification portion 326. These functions are implemented by executing a program stored in a ROM or the storage 33 and processing data stored in the storage 33 by the processor.

The driver authentication portion 321 performs authentication processing. The driver authentication portion 321 determines whether authentication information that coincides with identification information received from the motorcycle 20 is stored in the storage 33, and performs authentication processing.

If the authentication processing succeeds, the driver authentication portion 321 requests transmission of characteristic information to the motorcycle 20, and stores the characteristic information received from the motorcycle 20, in association with the authenticated identification information, in the storage 33.

If the authentication processing fails, the driver authentication portion 321 may request retransmission of identification information to the motorcycle 20 and perform authentication processing again, or may transmit a user ID and password registration request to the corresponding motorcycle 20 to register the user.

The travel environment determination portion 322 reads out characteristic information from the storage 33 for each driver, and determines the travel environment on the basis of information such as traffic information and map information, picked up images, and weather information included in the read out characteristic information. Since the operation of the travel environment determination portion 322 is roughly the same as the travel environment determination portion 172 of the first embodiment, detailed description is omitted.

The skill evaluation portion 323 sets the value of skill parameter on the basis of characteristic information read out from the storage 33. The skill evaluation portion 323 evaluates the skill of the driver by use of the detected value of the sensor, for example, having the same or close acquisition time as the traffic information and map information, picked up images, weather information, and the like that the travel environment determination portion 322 used to determine the travel environment. The skill evaluation portion 323 sets the skill parameter indicating the evaluated driver's skill, and sets it as the skill parameter in the travel environment determined by the travel environment determination portion 322. If the travel environment determination portion 322 determines multiple travel environments, the skill evaluation portion 323 sets the skill parameter for each of the determined travel environments. Since the operation of the skill evaluation portion 323 is the same as the skill evaluation portion 173 of the first embodiment, detailed description is omitted.

The emotion evaluation portion 324 sets the value of emotion parameter on the basis of characteristic information read out from the storage 33. The emotion evaluation portion 324 evaluates the emotion of the driver by use of biometric information, for example, having the same or close acquisition time as the traffic information and map information, picked up images, weather information, and the like that the travel environment determination portion 322 used to determine the travel environment. The emotion evaluation portion 324 sets the emotion parameter indicating the evaluated driver's emotion, and sets it as the emotion parameter in the travel environment determined by the travel environment determination portion 322. If the travel environment determination portion 322 determines multiple travel environments, the emotion evaluation portion 324 sets the emotion parameter for each of the determined travel environments. Since the operation of the emotion evaluation portion 324 is the same as the emotion evaluation portion 174 of the first embodiment, detailed description is omitted.

The setting change portion 325 calculates an evaluation value on the basis of the skill parameter set by the skill evaluation portion 323 and the emotion parameter set by the emotion evaluation portion 324. The setting change portion 325 reads out a threshold from the storage 33, compares the calculated evaluation value with the threshold, and sets a control parameter. The method of setting the control parameter is the same as that of the setting change portion 175 in the first embodiment. The setting change portion 325 stores the set control parameter, in association with identification information of the driver, in the storage 33. The setting change portion 325 also controls the communication portion 31 to transmit the set control parameter to the corresponding motorcycle 20.

The classification portion 326 classifies the values of skill parameter and emotion parameter calculated for each driver into categories. If the drivers are to be classified according to the skill parameter alone, the drivers may be classified into three categories including advanced level, middle level, and beginner level for each travel environment, for example, or may be classified into advanced level, middle level, and beginner level by taking into account the overall skill in all travel environments.

If the drivers are to be classified according to the emotion parameter alone, the drivers may be classified by a travel environment in which positive emotions such as "happy" and "fun" appear strongly, or, conversely, may be classified by a travel environment in which negative emotions such as "hard" and "afraid" appear strongly.

If the drivers are to be classified into categories according to the values of skill parameter and emotion parameter, the drivers may be classified into three categories including advanced level, middle level, and beginner level, and then the drivers classified into the categories may be further classified into drivers that show strong positive emotions such as "happy" and "fun," and drivers that show strong negative emotions such as "hard" and "afraid." The classification based on emotion may be classified by travel environments.

The classification portion 326 stores information indicating each category (hereinafter referred to as category information) and identification information on the driver classified into each category in association with each other in the storage 33.

While the classification portion that classifies the drivers into categories according to the skill parameter and the classification portion that classifies the drivers into categories according to the emotion parameter are configured of a single classification portion in the embodiment, classification of drivers by the skill parameter and classification of drivers by the emotion parameter may be performed in different functional blocks.

After categorizing the drivers, the classification portion 326 controls the communication portion 31 to transmit event information to the motorcycles 20 driven by the drivers of each category. The event information includes information suggesting motorcycle touring for each category of drivers classified into advanced level, middle level, and beginner level, and information such as "practice tour for mountain pass riding" targeted for drivers that have difficulty in traveling mountain passes, for example.

The motorcycle 20 receives the control parameter transmitted from the server device 3 in the mobile communication portion 226. The mobile communication portion 226 outputs the received control parameter to the controller 25.

The controller 25 controls an actuator 23 on the basis of the control parameter received by the mobile communication portion 226.

Figure 10:
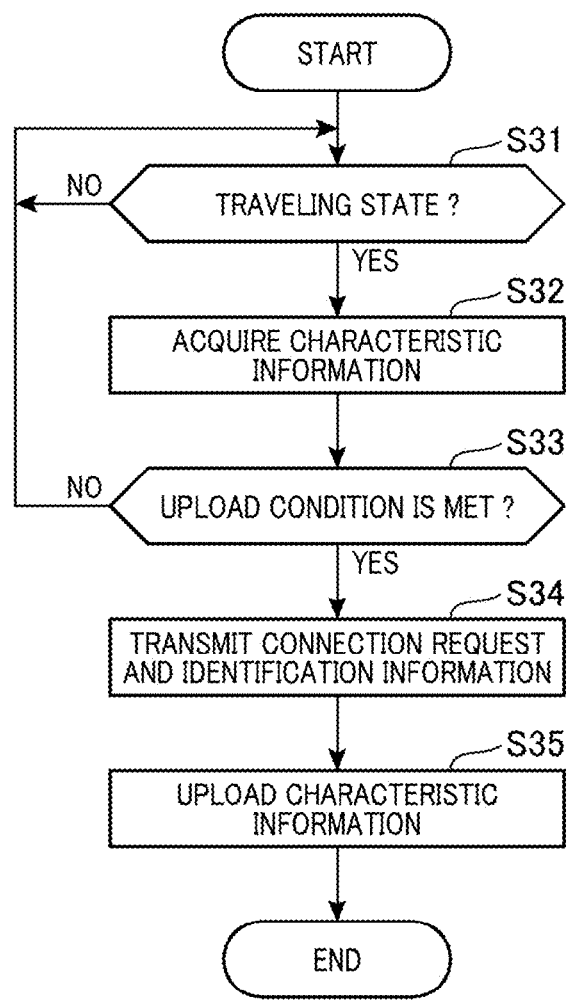
FIG. 10 is a flowchart showing an operation of the motorcycle.

FIG. 10 is a flowchart showing an operation of the controller 25 of the motorcycle 20 of the second embodiment.

The controller 25 of the motorcycle 20 determines whether the motorcycle 20 is in a traveling state on the basis of the detected value of the sensor such as a vehicle speed sensor 216 (step S31). If it is determined that the motorcycle 20 is not in a traveling state (step S31/NO), the controller 25 continues to determine whether the motorcycle 20 is in a traveling state on the basis of the input detected value of the sensor.

If it is determined that the motorcycle 20 is in a traveling state (step S31/YES), the controller 25 acquires characteristic information such as the detected value of the sensor portion 21, the detected value of the biometric sensor 225, images picked up by the onboard camera 222, traffic information, and map information (step S32). The controller 25 stores the acquired information as characteristic information in the storage 28.

Next, the controller 25 determines whether an upload condition is met (step S33). If it is determined that the upload condition is not met (step S33/NO), the controller 25 returns to step S31, and repeats the processing of steps S31 and S32 until the upload condition is met. If it is determined that the upload condition is met (step S33/YES), the controller 25 controls the mobile communication portion 226 and transmits a connection request to the server device 3. Upon receipt of an authentication request from the server device 3, the controller 25 transmits identification information of the driver to the server device 3, according to the authentication request (step S34). Then, upon receipt of a characteristic information transmission request from the server device 3, the controller 25 reads out characteristic information from the storage 28 and transmits the information to the server device 3.

Figure 11:
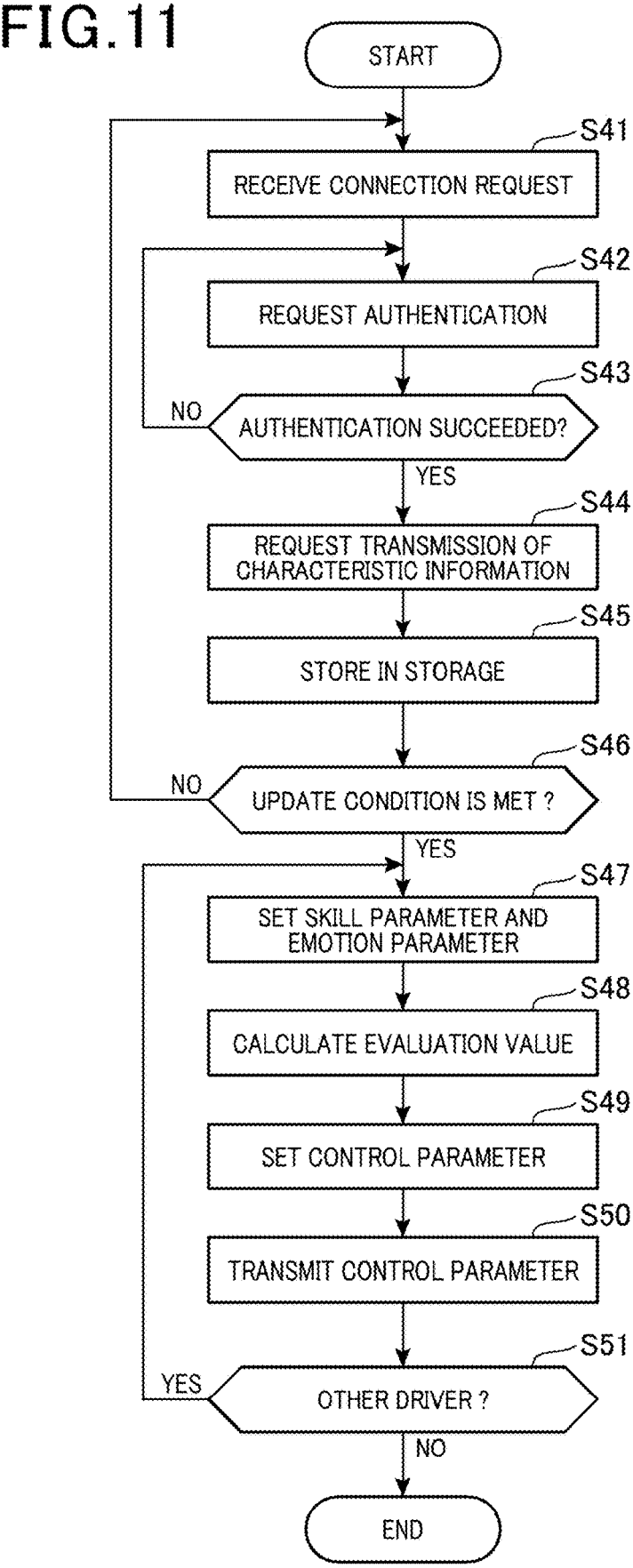
FIG. 11 is a flowchart showing an operation of the server device.

FIG. 11 is a flowchart showing an operation of the server device 3.

Upon receipt of a connection request from the motorcycle 20 by the communication portion 31 (step S41), the server-side controller 32 transmits an authentication request to the motorcycle 20 of the received connection request (step S42). Upon receipt of the driver's identification information from the motorcycle 20, the server-side controller 32 determines whether authentication information that coincides with the received identification information is stored in the storage 33, and performs authentication processing (step S43).

If the authentication processing fails (step S43/NO), the server-side controller 32 returns to step S42, and requests transmission of identification information to the motorcycle 20. If the authentication processing succeeds (step S43/YES), the server-side controller 32 requests transmission of characteristic information to the motorcycle 20 (step S44). Upon receipt of characteristic information from the motorcycle 20, the server-side controller 32 stores the received characteristic information, in association with the driver's identification information, in the storage 33 (step S45).

Next, the server-side controller 32 determines whether there is a driver who satisfies an update condition for updating a control parameter (step S46). Examples of the update condition include detection of the detected value of the sensor in all travel environments, and the elapse of a predetermined time or more from the last change of the control parameter. If the update condition is not met (step S46/NO), the server-side controller 32 returns to step S41, and waits for a connection request from the motorcycle 20.

If the update condition is met (step S46/YES), the server-side controller 32 sets the values of skill parameter and emotion parameter of the driver who satisfies the update condition, for each travel environment (step S47).

Next, the server-side controller 32 calculates an evaluation value on the basis of the set skill parameter and emotion parameter and the factor table shown in FIG. 4, for each travel environment (step S48). After calculating the evaluation value, the server-side controller 32 compares the calculated evaluation value with a threshold prepared for each travel environment, and sets the value of control parameter (step S49).

After setting the control parameter, the server-side controller 32 stores the set control parameter, in association with the corresponding driver's identification information, in the storage 33. The server-side controller 32 also transmits the set control parameter to the motorcycle 20 of the received connection request (step S50). Upon completion of transmission of the control parameter, the server-side controller 32 determines whether there are other drivers who satisfy the update condition (step S51). If there is another driver (step S51/YES), the server-side controller 32 returns to the processing of step S47, and repeats the processing of steps S47 to S50. If there is no other driver (step S51/NO), the server-side controller 32 ends the processing flow.

In the flowchart shown in FIG. 11, the operation of receiving characteristic information transmitted from the motorcycle 20 and storing the information in the storage 33 is performed, and then the operation of setting the control parameter is performed. However, the two operations may be performed separately.

As has been described, the driving assistance system (50) of the second embodiment is the driving assistance system (50) that includes the information detection device (200) installed in the motorcycle 20, and the server device (3).

The server device (3) includes: the communication portion 31 that receives, from the information detection device, operation state information indicating a driving state of the motorcycle 20 by a driver, environment information indicating an environment in which the motorcycle 20 travels, and emotion information indicating the driver's emotion or change in emotion; the skill evaluation portion 323 and the emotion evaluation portion 324 that estimate the driver's characteristic with respect to the motorcycle 20 on the basis of the driving state of the driver in the environment indicated by the environment information and the driver's emotion or change in emotion during driving; and the setting change portion 325 that generates setting information of various control performed in the motorcycle 20 on the basis of the driver's characteristic estimated by the skill evaluation portion 323 and the emotion evaluation portion 324. The server device (3) transmits the setting information generated by the setting change portion 325 to the information detection device (200).

According to this configuration, the server device 3 can estimate the driver's characteristic with respect to the vehicle on the basis of the driving state of the driver in the environment and the driver's emotion or change in emotion during driving. Additionally, the server device 3 can change the setting of various control in the vehicle on the basis of the estimated driver's characteristic. Accordingly, the setting on various controls of the motorcycle 20 can be set with high accuracy on the basis of the driving state of the driver in the environment and the driver's emotion or change in emotion.

The skill evaluation portion 323 generates a skill parameter evaluating the driver's driving skill in the environment indicated by the environment information on the basis of the operation state information, whereas the emotion evaluation portion 324 generates an emotion parameter evaluating the driver's emotion with respect to the environment indicated by the environment information on the basis of the emotion information. The skill evaluation portion 323 and the emotion evaluation portion 324 store the generated skill parameter and emotion parameter, in association with identification information for identifying the driver, in the storage 33.

According to this configuration, the skill parameter evaluating the driver's driving skill and the emotion parameter evaluating the driver's emotion can be stored in the storage 33 in association with the driver's identification information.

The server device (3) includes the classification portion 326 that compares the skill parameter of each driver with a preset threshold, and classifies each driver into a preset category according to the comparison result. According to this configuration, each driver can be classified into a category set in accordance with the driver's skill.

The server device (3) is characterized by including the classification portion 326 that compares the emotion parameter of each driver with a preset threshold, and classifies each driver into a preset category according to the comparison result.

According to this configuration, each driver can be classified into a category set in accordance with the driver's emotion.

In the driving assistance system (50) of the present invention, the server device (3) transmits, to the information detection device (200) installed in the motorcycle 20 driven by each driver classified into the same category by the classification portion 326, information prompting participation in an event held for each category.

According to this configuration, it is possible to transmit information prompting participation in an event held for each category, to each of drivers classified into the same category.

The server device (3) transmits, to the information detection device (200) installed in the motorcycle 20 driven by each driver classified into the same category by the classification portion 326, information prompting participation in an event held for each category.

According to this configuration, it is possible to transmit information prompting participation in an event to each of drivers classified into the same category.

The above embodiments are preferred embodiments of the present invention. Note, however, that the invention is not limited to the embodiments, and various modifications can be made within the scope of the invention.

For example, in the above embodiments, mean values of the skill parameters calculated for each travel environment by the skill evaluation portion 173 and of the emotion parameters calculated for each travel environment by the emotion evaluation portion 174 are calculated in the setting change portion 175. However, if the value of control parameter is set for each travel environment, the mean value does not have to be calculated. In this case, the factor table shown in FIG. 4 is prepared for each travel environment, and the setting change portion 175 calculates an evaluation value for each travel environment by use of the skill parameter, emotion parameter, and the factor table of the corresponding travel environment, to set the value of control parameter.

In the first and second embodiments, when there is a travel environment whose characteristic information cannot be acquired or whose acquired amount of characteristic information is small, the controller 15 of the motorcycle 10 and the server device 3 may display information suggesting travel in the travel environment on the display panel 137 (237). That is, the controller 15 of the motorcycle 10 and the server device 3 may suggest a touring plan including a travel environment that the driver has not driven, or has hardly driven.

When the driver purchases a new vehicle, the value of control parameter set for the driver before purchase of the new vehicle may be transferred to the new vehicle. Moreover, when the driver purchases the motorcycle 10 (20), or is borrowing the motorcycle 10 (20) of another driver, the value of control parameter set in these motorcycles 10 (20) may be restricted by a certain percentage (e.g., 20% or 30%). If a predetermined time or more has passed from the last driving operation, the value of control parameter set in the motorcycle 10 (20) may be restricted by a certain percentage (e.g., 20% or 30%), for example.

Then, if the driver drives the motorcycle 10 (20) for a predetermined time, the restriction on the value of control parameter may be cancelled.

If it is determined on the basis of the skill parameter that the driver's skill has improved, the server device 3 may suggest purchase (switching) of a new vehicle that suits the driver's skill.

Moreover, in order to collect the driver's characteristic information, the server device 3 may assign a travel point to the driver every time the motorcycle 20 travels a predetermined distance. An administrator of the driving assistance system 50 may provide service according to the assigned travel point to the driver. The travel point may be assigned when the driver's driving is evaluated as being safe or environment-friendly based on the skill parameter or emotion parameter.

The server device 3 may suggest, to the driver, a touring plan including a travel environment in which the driver has hardly driven or has never driven, and assign the traveling point when the driver goes touring according to the touring plan suggested by the server device 3. Moreover, the server device 3 may change the value of skill parameter (positive evaluation) according to the assigned travel point.

Additionally, the driver's emotion or change in emotion when he/she passes another motorcycle 20 may be detected to suggest the motorcycle 20 to the driver.

For example, the motorcycle 20 picks up an image in the direction of the driver's line of sight by the onboard camera 222, and picks up an image of the motorcycle 20 passing by. The motorcycle 20 transmits the picked up image and biometric information and the like of the driver when passing the motorcycle 20 to the server device 3. The server device 3 identifies the motorcycle 20 or the type of motorcycle 20 that the driver showed interest in, on the basis of the image of the motorcycle 20 and the driver's emotion or change in emotion. Then, the server device 3 may transmit suggestion information suggesting purchase of the identified motorcycle 20 or the motorcycle 20 of the identified type to the driver. The server device 3 may transmit suggestion information to the motorcycle 20 that the driver drives, or the driver's email address may be registered in advance, so that the suggestion information may be transmitted to this address.

The server device 3 may compare the skill parameter of a driver (driver A) with the skill parameter of the motorcycle 20 that the driver A showed interest in or of another driver (driver B) riding the motorcycle 20, and determine whether the driving skill of the driver A is appropriate for driving the motorcycle 20 that the driver B is driving. If the driver A has the driving skill appropriate for driving the motorcycle 20 that the driver B is driving, the server device 3 may suggest switching to the motorcycle 20 that the driver B is driving to the driver A. Moreover, along with changes in the driver's interest, switching to different types of motorcycles 20 may be suggested according to the driver's skill and driving characteristic.

Additionally, the server device 3 may change the discount rate of insurance fee on the basis of the driving record and the driver's skill parameter. For example, if the driver has a poor driving record, the insurance fee rises, but if the server device 3 determines afterwards that the driver's skill parameter improves and the driving skill increases, the insurance fee may be discounted.

REFERENCE SIGNS LIST 2 network
3 server device (driving assistance device)
10, 20 motorcycle (vehicle)
11, 21 sensor portion (driving state detection portion)
13, 23 actuator
14, 24 navigation system (environment detection portion)
15, 25 controller
17 driver characteristic estimation portion
18, 28, 33 storage
20 motorcycle (vehicle)
31 communication portion
32 server-side controller
50 driving assistance system
100, 300 driving assistance device
121, 221 switch
122, 222 onboard camera (environment detection portion)
123, 223 operating portion
124, 224 headset
125, 225 biometric sensor (emotion detection portion)
126, 226 mobile communication portion (environment detection portion)
141, 241 GPS receiver
142, 242 map database
151, 251 engine controller
152, 252 brake controller
153, 253 shift controller
154, 254 suspension controller
171, 321 driver authentication portion
172, 322 travel environment determination portion (environment detection portion)
173, 323 skill evaluation portion (characteristic estimation portion)
174, 324 emotion evaluation portion (characteristic estimation portion)
175, 325 setting change portion (change portion)
176 restriction determination portion (change portion)
200 information detection device
326 classification portion

The invention claimed is:

1. A driving assistance device that supports driving of a driver, comprising a processor, the processor functions as:
   a driving state detection portion that detects a driving state of a vehicle by the driver;
   an environment detection portion that detects an environment in which the vehicle travels;
   an emotion detection portion that detects the driver's emotion or change in emotion;

a characteristic estimation portion that estimates the driver's characteristic with respect to the vehicle on the basis of the driving state of the driver in the detected environment, and the driver's emotion or change in emotion during the driving state; and a change portion that changes setting of various control in the vehicle on the basis of the driver's characteristic estimated by the characteristic estimation portion, wherein:

the characteristic estimation portion functions as:

a skill evaluation portion that generates skill evaluation parameters including braking, acceleration, engine behavior, and suspension behavior used to evaluate a driving skill of the driver in an environment on the basis of the driving state detected by the driving state detection portion and the environment detected by the environment detection portion, and an emotion evaluation portion that generates an emotion evaluation parameter evaluating an emotion of the driver in an environment on the basis of an emotion or change in emotion detected by the emotion detection portion and the environment detected by the environment detection portion;

the processor, by the emotion evaluation portion, plots the driver's emotion or the change in emotion detected by the emotion detection portion on a map having regions divided into a region in which the driver's emotion that has been determined to be appropriate for driving is associated with and a region in which the driver's emotion that has been determined to be inappropriate for driving is associated with, and changes values of the skill evaluation parameter and the emotion evaluation parameter based upon a location or directional change of location of the plotted emotion on the map; and by the setting change portion, changes setting of engine output that includes a throttle valve, suspension setting that includes a damping force of a damper, and a braking force and an activation timing of a braking device in the vehicle on the basis of the changed skill evaluation parameter and emotion evaluation parameter.

2. The driving assistance device according to claim 1, wherein
the processor, by the characteristic estimation portion, determines the driver's driving skill on the basis of the driving state of the driver in a plurality of the environments detected by the environment detection portion, and thereby estimates the driver's characteristic.

3. The driving assistance device according to claim 1, wherein
the processor, by the characteristic estimation portion, determines whether the emotion or change in emotion detected by the emotion detection portion is an emotion or change in emotion that is appropriate for driving, and thereby estimates the driver's characteristic.

4. The driving assistance device according to claim 1, wherein
the processor, by characteristic estimation portion, determines a driving tendency of the driver based upon the driving state of the driver in a plurality of the environments detected by the environment detection portion, and thereby estimates the driver's characteristic.

5. The driving assistance device according to claim 1, wherein
the processor, by the characteristic estimation portion, estimates the driver's characteristic on the basis of a time when a preset emotion determined to be appropriate for driving appears in driving, or a time when a preset emotion determined to be inappropriate for driving appears in driving.

6. The driving assistance device according to claim 1, wherein
the processor, by the characteristic estimation portion, estimates the driver's characteristic based upon a frequency of emotion change from a preset emotion determined to be appropriate for driving to a preset emotion determined to be inappropriate for driving, or emotion change from a preset emotion determined to be inappropriate for driving to a preset emotion determined to be appropriate for driving.

7. The driving assistance device according to claim 1, wherein
the processor, by the setting change portion, changes the setting of various control according to the driver's emotion or change in emotion detected by the emotion detection portion when the driver starts driving, or during driving.

8. A driving assistance system comprising:
an information detection device, having a first processor, installed in a vehicle; and
a server device, wherein:
the server device includes a second processor,
the second processor functions as:
a receiver that receives, from the information detection device, operation state information indicating a driving state of the vehicle by a driver, environment information indicating an environment in which the vehicle travels, and emotion information indicating the driver's emotion or change in emotion,
a characteristic estimation portion that estimates the driver's characteristic with respect to the vehicle on the basis of the driving state of the driver in the environment indicated by the environment information and the driver's emotion or change in emotion during the driving state,
a setting change portion that generates setting information on various control performed in the vehicle, on the basis of the driver's characteristic estimated by the characteristic estimation portion, and
a transmitter that transmits the setting information generated by the setting change portion to the information detection device;
the characteristic estimation portion includes:
a skill evaluation portion that generates skill evaluation parameters including braking, acceleration, engine behavior, and suspension behavior used to evaluate a driving skill of the driver in an environment on the basis of a driving state indicated by the driving state information and an environment indicated by the environment information, and
an emotion evaluation portion that generates an emotion evaluation parameter evaluating an emotion of the driver in an environment on the basis of the emotion or change in emotion indicated by the emotion information and the environment indicated by the environment information;
wherein the second processor, by the characteristic estimation portion, plots the emotion indicated by the emotion information on a map having regions divided into a region that the driver's emotion determined to be appropriate for driving is associated with and a region that the driver's emotion determined to be inappropriate for driving is associated with, and changes values of the skill evaluation parameter and the emotion evaluation parameter on the basis of a location or directional change of the location of the plotted emotion on the map; and by the setting change portion, changes setting of engine output that includes a position of a throttle valve, suspension setting that includes a damping force of a damper, and a braking force and an activation timing of a braking device in the vehicle on the basis of the changed skill evaluation parameter and emotion evaluation parameter.

9. A driving assistance system comprising:
an information detection device, having a first processor, installed in a vehicle; and
a server device, wherein:
the server device includes a second processor, the second processor functions as:
   a receiver that receives, from the information detection device, operation state information indicating a driving state of the vehicle by a driver, environment information indicating an environment in which the vehicle travels, and emotion information indicating a driver's emotion or change in emotion,
   a characteristic estimation portion that estimates the driver's characteristic with respect to the vehicle on the basis of the driving state of the driver in an environment indicated by the environment information and the driver's emotion or change in emotion during the driving state,
   a setting change portion that generates setting information on engine output that includes a position of a throttle valve, suspension setting that includes a damping force of a damper, and a braking force and an activation timing of a braking device performed in the vehicle, on the basis of the driver's characteristic estimated by the characteristic estimation portion, and
   a transmitter that transmits the setting information generated by the setting change portion to the information detection device;
the second processor, by the characteristic estimation portion, functions as a skill evaluation portion that generates skill evaluation parameters including braking, acceleration, engine behavior, and suspension behavior used to evaluate a driving skill of the driver in the environment indicated by the environment information, on the basis of the operation state information, and
   an emotion evaluation portion that generates an emotion evaluation parameter evaluating an emotion of the driver with respect to the environment indicated by the environment information, on the basis of the emotion information;
the second processor, by the emotion evaluation portion, plots the driver's emotion or the change in emotion detected by the emotion detection portion on a map having regions divided into a region that the driver's emotion determined to be appropriate for driving is associated with and a region that the driver's emotion determined to be inappropriate for driving is associated with, and changes values of the skill evaluation parameter and the emotion evaluation parameter based upon a location or directional change of the location of the plotted emotion on the map,
the skill evaluation parameter and the emotion evaluation parameter are stored, in association with identification information for identifying the driver received from the information detection device, in a storage;

the second processor of the server device functions as a first classification portion that compares the skill evaluation parameter of each driver with a preset threshold, and classifies the each driver into a preset category according to a comparison result; and the second processor of the server device transmits, to the information detection device installed in the vehicle driven by each of drivers classified into the same category by the first classification portion, information prompting participation in an event held for each category.

10. A driving assistance system comprising:
an information detection device, having a first processor, installed in a vehicle; and
a server device, wherein:
the server device includes a second processor, the second processor functions as:
   a receiver that receives, from the information detection device, operation state information indicating a driving state of the vehicle by a driver, environment information indicating an environment in which the vehicle travels, and emotion information indicating a driver's emotion or change in emotion,
   a characteristic estimation portion that estimates the driver's characteristic with respect to the vehicle on the basis of the driving state of the driver in an environment indicated by the environment information and the driver's emotion or change in emotion during the driving state,
   a setting change portion that generates setting information on engine output that includes a position of a throttle valve, suspension setting that includes a damping force of a damper, and a braking force and an activation timing of a braking device performed in the vehicle, on the basis of the driver's characteristic estimated by the characteristic estimation portion, and
   a transmitter that transmits the setting information generated by the setting change portion to the information detection device;
the second processor, by the characteristic estimation portion, functions as a skill evaluation portion that generates skill evaluation parameters including braking, acceleration, engine behavior, and suspension behavior used to evaluate a driving skill of the driver in the environment indicated by the environment information, on the basis of the operation state information, and
   an emotion evaluation portion that generates an emotion evaluation parameter evaluating the emotion of the driver with respect to the environment indicated by the environment information, on the basis of the emotion information;
the second processor, by the emotion evaluation portion, plots the driver's emotion or the change in emotion detected by the emotion detection portion on a map having regions divided into a region that the driver's emotion determined to be appropriate for driving is associated with and a region that the driver's emotion determined to be inappropriate for driving is associated with, and changes values of the skill evaluation parameter and the emotion evaluation parameter based upon a location or directional change of the location of the plotted emotion on the map,
the skill evaluation parameter and the emotion evaluation parameter are stored, in association with identification information for identifying the driver received from the information detection device, in a storage;

the second processor of server device functions as a second classification portion that compares the emotion evaluation parameter of each driver with a preset threshold, and classifies each driver into a preset category according to a comparison result; and the second processor of the server device transmits, to the information detection device installed in the vehicle driven by each driver classified into a same preset category by the second classification portion, information prompting participation in an event held for each category.

11. A control method of a driving assistance device that supports driving of a driver, the method comprising:

an operation state detection step of detecting a driving state of a vehicle by the driver;

an environment detection step of detecting an environment in which the vehicle travels;

an emotion detection step of detecting the driver's emotion or change in emotion;

a characteristic estimation step of estimating the driver's characteristic with respect to the vehicle, on the basis of a driving state of the driver in a detected environment and the driver's emotion or change in emotion during the driving state; and a setting change step of changing setting of various control in the vehicle on the basis of the driver's characteristic estimated in the characteristic estimation step, wherein:

the characteristic estimation step includes:

a skill evaluation parameter generation step of generating skill evaluation parameters including braking, acceleration, engine behavior, and suspension behavior used to evaluate a driving skill of the driver in the environment, on the basis of a driving state detected in the operation state detection step and an environment detected in the environment detection step, and an emotion evaluation parameter generation step of generating an emotion evaluation parameter evaluating an emotion of the driver in the environment, on the basis of an emotion or change in emotion detected in the emotion detection step and an environment detected in the environment detection step;

in the characteristic estimation step, the driver's emotion or change in the emotion detected in the emotion detection step is plotted on a map having regions divided into a region that the driver's emotion determined to be appropriate for driving is associated with and a region that the driver's emotion determined to be inappropriate for driving is associated with, and values of the skill evaluation parameter and the emotion evaluation parameter are changed based upon a location or directional change of the location of the plotted emotion on the map; and in the setting change step, setting of engine output that includes a position of a throttle valve, suspension setting that includes a damping force of a damper, and a braking force and an activation timing of a braking device in the vehicle is changed on the basis of the changed skill evaluation parameter and emotion evaluation parameter.

* * * * *